US012594692B2

(12) United States Patent
Andjelic et al.

(10) Patent No.: US 12,594,692 B2
(45) Date of Patent: Apr. 7, 2026

(54) ABSORBABLE POLY(P-DIOXANONE) PELLETS MADE FROM SLOW-TO-CRYSTALLIZE GROUND RESIN AND ITS FINES

(71) Applicants:Ethicon, Inc., Raritan, NJ (US); Cilag GmbH International, Zug (CH)

(72) Inventors: Sasa Andjelic, Nanuet, NY (US); Jitendra Patel, Raritan, NJ (US); Marc Wisnudel, Raritan, NJ (US); Luke Orzechowski, Raritan, NJ (US)

(73) Assignees: Ethicon, Inc., Raritan, NJ (US); Cilag GmbH International, Zug (CH)

( * ) Notice: Subject to any disclaimer, the term of this patent is extended or adjusted under 35 U.S.C. 154(b) by 162 days.

(21) Appl. No.: 18/358,071

(22) Filed: Jul. 25, 2023

(65) Prior Publication Data

US 2025/0033248 A1     Jan. 30, 2025

(51) Int. Cl.
| | |
|---|---|
| B29C 64/00 | (2017.01) |
| B29B 9/06 | (2006.01) |
| C08G 63/66 | (2006.01) |
| B29K 67/00 | (2006.01) |

(52) U.S. Cl.
CPC .............. B29B 9/06 (2013.01); C08G 63/66 (2013.01); B29K 2067/00 (2013.01); B29K 2995/0088 (2013.01)

(58) Field of Classification Search
CPC .................................. B29B 9/06; C08G 63/66
See application file for complete search history.

(56) References Cited

U.S. PATENT DOCUMENTS

| | | | |
|---|---|---|---|
| 4,052,988 A | 10/1977 | Doddi et al. | |
| 5,451,461 A | 9/1995 | Broyer | |
| 5,644,002 A * | 7/1997 | Cooper | A61L 24/043 |
| | | | 525/413 |
| 5,652,331 A | 7/1997 | Forschner | |
| 5,688,900 A * | 11/1997 | Cooper | C08L 67/025 |
| | | | 528/301 |
| 5,717,059 A | 2/1998 | Forschner | |
| 5,844,067 A | 12/1998 | Erneta | |
| 6,448,367 B1 | 9/2002 | Akieda | |

(Continued)

OTHER PUBLICATIONS

Bezwada, R. S.; Jamiolkowski, D. D.; Cooper, K. In Handbook of Biodegradable Polymers; Domb, A. J.; Kost, J.; Wiseman, D. M., Eds.; Harwood Academic: Singapore, 1997; Chapter 2.

(Continued)

*Primary Examiner* — Nicholas R Krasnow
(74) *Attorney, Agent, or Firm* — David R. Crichton; Leo B. Kriksunov

(57) ABSTRACT

The present invention is directed to methods for processing absorbable, slow-to-crystallize poly(p-dioxanone) ground resin and its fines utilizing a twin-screw extruder apparatus to produce uniform pellets. Advantageously, the ground resin materials resulting from solid-state polymerization do not undergo processing, such as sieving, to remove fines from the feedstock for an extrusion and pelletizing system that has been configured with an inverted temperature profile along the extrusion barrel. The resulting PDS pellets have improved resin uniformity and greater polymer yield for improved operational efficiencies and production of extruded filaments.

14 Claims, 7 Drawing Sheets

Reaction → Polymer Pucks → Curing (4 days) → Grinding/Sieving + Drying → GROUND PDS POLYMER Ground Polymer

(56)                  References Cited

U.S. PATENT DOCUMENTS

| | | | | |
|---|---|---|---|---|
| 8,225,673 | B2* | 7/2012 | D'Agostino | G01N 3/08 |
| | | | | 73/830 |
| 8,236,904 | B2 | 8/2012 | Andjelic et al. | |
| 8,450,431 | B2 | 5/2013 | Andjelic et al. | |
| 9,862,826 | B2 | 1/2018 | Hillberg et al. | |
| 9,873,790 | B1 | 1/2018 | Andjelic et al. | |
| 11,028,222 | B2 | 6/2021 | Andjelic et al. | |
| 11,136,696 | B2 | 10/2021 | Chen et al. | |
| 2005/0048121 | A1* | 3/2005 | East | A61L 27/54 |
| | | | | 528/274 |
| 2010/0318108 | A1* | 12/2010 | Datta | A61L 31/146 |
| | | | | 156/60 |
| 2020/0165380 | A1* | 5/2020 | Andjelic | C08J 3/12 |

OTHER PUBLICATIONS

International Search Report and Written Opinion, received for PCT Application No. PCT/IB2024/057172, mailed on Nov. 4, 2024, 12 pages.
Surowiecki, James, "Understanding twin-screw extruders: The high-speed energy input (HSEI) concept", Words of Wisdom, pp. 11, Mar. 3, 2006.

* cited by examiner

Reaction → Polymer Pucks → Curing (4 days) → Grinding/Sieving + Drying → Ground Polymer

ABSORBABLE POLY(P-DIOXANONE) PELLETS MADE FROM SLOW-TO-CRYSTALLIZE GROUND RESIN AND ITS FINES

FIELD OF THE INVENTION

This invention describes novel methods in processing of absorbable, slow-to-crystallize poly(p-dioxanone) ground resin and its fines utilizing a twin-screw extruder apparatus. The pelletization step may include additional devolatization features removing unreacted p-dioxanone monomer. Such formed PDS pellets have improved resin uniformity and greater polymer yield and utilize fines that would otherwise be discarded prior to extrusion.

BACKGROUND OF THE INVENTION

Problems to be Solved

Absorbable Poly (p-dioxanone) (PDS) polymer is typically made by solid state polymerization in which pucks are cured in an oven for several days. Afterwards, these PDS pucks are subjected to a grinding procedure that can produce a wide distribution of granules and fines. The fines are often not chemically uniform because oven curing of polymer pucks is not equal. Grinding fines are customarily removed or discarded before further finishing and drying steps because they can negatively affect fiber extrusion. The consequent loss of polymer yield due to fines removal is estimated to be about 8-10% by weight. Unfortunately, polymer fines can also be generated during the subsequent drying and finishing steps. These drying generated polymer fines are typically not removed, and may ultimately cause feeding and melting issues during extrusion.

Gradient variations in molecular weight, inherent viscosity, and polymerization level exist can arise from a pucks' position in the oven and any non-uniform thermal conduction in the oven. Also, each individual puck's cross-section may exhibit differences in a polymer properties when measured from a top surface, middle or the bottom of the puck. Variation in polymer chemistry/morphology in the resin, can negatively affect fiber extrusion and final fiber properties. One method that has been followed to reduce chemical differences between PDS granules generated in the grinding process is to conduct an additional melting (mixing) step, followed by pelletization.

The step of pelletizing absorbable PDS ground resin and associated fines, however, can presents a significant technical challenges. This step can be challenging because PDS resin will crystallize relatively slowly from the melt, and has a glass transition temperature. $T_g$ that is well below room temperature. In addition, solid state cured PDS granules also have a relatively high monomer content (around 10%), which makes a resulting PDS extrudate likely to be too soft prior to strand pelletization and makes a cutting step extremely difficult. The high monomer level in pellets is also not desirable, since a polymer with high monomer content is moisture sensitive, causing a significant degradation prior and during the drying procedure. Therefore, removing unreacted monomer during pelletization is also very desirable from polymer degradation stability point. Finally, removing monomer in pelletization step reduces subsequent vacuum drying time, which improves operational efficiencies and effectively lowers costs.

BACKGROUND

The homopolymer and copolymers of p-dioxanone are of interest in the medical device and pharmaceutical fields due to a preferred toxicity profile, softness, and flexibility. Poly (p-dioxanone) (PDS) was first suggested as an absorbable polymer by Doddi et al. [U.S. Pat. No. 4,052,988A "Synthetic absorbable surgical devices of poly-dioxanone" by Namassivaya Doddi; Charles C. Versfelt, and David Wasserman (Ethicon, Inc.)]. By the early 1980s, the PDS homopolymer was used to form of a monofilament surgical suture. Since then, many p-dioxanone copolymers have been described [Bezwada, R. S.; Jamiolkowski, D. D.; Cooper, K. In Handbook of Biodegradable Polymers; Domb, A. J.; Kost, J.; Wiseman, D. M., Eds.; Harwood Academic: Singapore, 1997; Chapter 2.].

PDS, with its low glass-transition temperature (Tg=−10° C.), is inherently soft and flexible. The low value of Tg also allows this crystallizable material to exhibit these properties at room temperature. Thus, besides being well suited for surgical monofilaments, it can be injection-molded into several non-filamentous surgical devices such as clips (AB-SOLOK™ and LAPRA-TY™), and fasteners (Mitek Meniscal Repair System). These surgical articles take full advantage of the general toughness exhibited by the PDS-based polymer family.

A standard procedure for forming PDS polymer involves an initial short liquid (melt) phase in a reactor, followed by an extended solid phase in a curing oven typically set at the temperatures between 65° C. to 85° C. [see U.S. Pat. Nos. 4,052,988, 5,717,059, and 6,448,367B1]. For instance, U.S. Pat. No. 4,052,988 "Synthetic absorbable surgical devices of poly-dioxanone" by Namassivaya Doddi; Charles C. Versfelt, and David Wasserman (Ethicon, Inc.) describes the synthesis of absorbable PDS homopolymers starting in melt, and finishes utilizing solid state curing step at 80° C. The resin is used in subsequent fiber production for use as surgical sutures. The use of solid-state stage is because formed PDS is in thermodynamic equilibrium with its p-dioxanone monomer, causing the shift of monomer regeneration at higher reaction temperature. Lowering the reaction temperature to the range between 65° C. and 85° C., the resin solidifies or crystallizes, which helps to advance the polymerization (monomer conversion). However, due to diffusional difficulties in the solid state, the reaction kinetics are very slow and require several days to achieve high conversion. Oven cured PDS typically has about 5-15 mole % of unreacted p-dioxanone monomer before a drying step.

U.S. Pat. No. 5,717,059 describes a method for preparing PDS by first, producing a reaction product mixture of molten PDS and unreacted p-dioxanone, and then solidifying that mixture into a plurality of solid granules. The granules are then transferred into a separator vessel where, under reduced pressure and temperature, granules are swept by an inert gas. This procedure separates the polymer from monomer, which is being recycled in a continuous process. The patent noted that one of the problems of monomer removal directly from the PDS by applying 2.5-hour vacuum to remove unreacted monomer. The weight average molecular weight of the polymer after monomer removal dropped dramatically by 41% of the molecular weight of the polymer prior to vacuum stage. This was explained by a shift in chemical equilibrium as the monomer was removed from the polymer/monomer mixture.

U.S. Pat. No. 5,652,331 describes an attempt to address the problem of monomer removal in the PDS melt by adding to product mixture a cyclic anhydride to form end-capped PDS. The reaction continues by applying the vacuum while exposing the mixture at a temperature range of about 50 to about 150° C. The final step involves recovering the end-capped PDS. Data indicated difficulties of removing unreacted monomer from the melt because of the tendency of the polymer to degrade significantly, or the loss of molecular weight as the monomer is removed. However, inducing the chemical reaction of PDS with cyclic anhydride, the formed product withstands chemical degradation after the monomer removal.

Melt processing of polymers involving pelletization is described in U.S. Pat. Nos. 5,844,067 and 9,862,826. However, neither of these references describe the use of a pelletization step on slow crystallizing, absorbable polymers having a glass transition temperature of below 20° C., particularly pelletization of PDS that is additionally moisture sensitive and prone to fast degradation.

U.S. Pat. No. 9,873,790 (Andjelic et al.) describes novel absorbable, semi-crystalline, polymer blend compositions exhibiting enhanced crystallization and nucleation rates. These blends contain ultra-high molecular weight component of the same polymer that dramatically improved ability of blends to crystallize. One of the blends of PDS and its ultrahigh molecular weight counterpart were able to pelletize using a twin screw extruder apparatus.

Finally, U.S. Pat. No. 11,028,222 [Andjelic et al., "Advanced Processing of Absorbable Poly (p-dioxanone) Containing High Level of p-dioxanone Monomer"], describes the synthesis and underwater pelletization of melt-polymerized PDS polymer. The reference is silent of pelletizing solid state produced PDS ground resins and its fines by using any method, including a strand pelletization with a twin screw extruder.

SUMMARY OF THE INVENTION

The present invention describes inventive methods and processes for successfully producing PDS pellets from both, ground resins and its fines using a typical twin extruder that can continuously produce pellets of a desired size with a high throughput rate A novel process may include additional devolatization steps to remove unreacted monomer prior drying. Some of the benefits of the new process are:

1. Chemically and physically more uniform, as described more fully below, PDS pellets, which reduces potential extruded fiber/filament product properties issues;
2. Improving polymer yield by allowing the use of ground fines, which are typically removed prior to extrusion;
3. Eliminating regeneration of fines during subsequent drying step; and
4. If devolatization during extrusion to cutting step is used, there is the potential for reduced drying time, due to removal of unreacted p-dioxanone monomer generated during pelletization process.

Several innovative steps are introduced during a extrusion to pelletization of PDS by use of a twin extruder having a selected temperature profile along the length of the barrel that allows for successful pelletization of the ground resin and its fines, even extruded with upwards of 10 percent by weight of unreacted, residual monomer.

The preferred pelletization and extrusion system includes, a high-mixing twin screw design, preferably a ZSK-30 (30 mm) twin extruder, using an inverted or reverse (relative to the customary) temperature profile, such as from 140° C. at the feed to 95° C. at the die, a single or double water bath, one or two vacuum ports, and various extruder temperature profiles screw speeds from 100 RPM to 300 RPM depending on polymer viscosity (molecular weight). Alternatively, instead of water baths, air drying conveys may be employed with sufficient residence time under air blow to allow for sufficient crystallization, preferably in each instance at least 15% as measured by DSC, to take place.

In a still further alternative, pelletization via the twin extruder system can be carried out without vacuum ports to produce pellets having a large amount of monomer, an amount of monomer that may be as much as about 10%, and thereby being more sensitive to moisture and subsequent degradation upon storage and subsequent post-processing.

Using inventive processing parameters, such as extruder particulars described below, including screw speed (rpm), and throughput rate inputs to produce an average specific energy between 0.210 kw/kg/hr and 0.370 kw/kg/hr, depending on molecular weight of a resin, it will be described that more chemically and physically uniform PDS pellets can be produced with lower, standard molecular weight (between 70,000 g/mol and 85,000 g/mol), as well as high molecular weight polymer having a weight average molecular weight that is higher than 85,000 g/mol.

Successful pelletization operations were conducted on both natural (undyed) and dyed PDS ground resins and fines. Analytical data revealed that no degradation, as demonstrating by comparison of molecular weight of the resin before and after extrusion by GPC or IV techniques, of PDS polymer was observed for all conditions used for lower and regular molecular weight polymer. Only a limited degradation was observed for extra high molecular polymers, those original ground resins with weight average molecular weight of about 90,000 g/mol and up, and inherent viscosities above 2.0 dL/g, using the high screw speeds (around 300 rpm). However, a slight polymer degradation, a 5-10% drop relative to the original resin before extrusion, does not affect fiber's physical and biological (Breaking Strength Retention, BSR) properties. It was found that with the present inventive process a monomer removal was almost complete, as measured by NMR and, preferably concluding with a residual monomer content of 2% or below for lower throughput rates (up to 5 kg/h). For the highest throughput rates (20-25 kg/h) monomer removal is about 50% from its original level.

Annealed, size 2-0 PDS monofilament fibers produced from PDS pellets showed excellent Instron tensile, as well as biological performance, such as BSR properties. Most importantly, tested side-by-side, natural and dyed fibers made from the PDS pellet feed materials using the inventive process showed similar BSR profile compared to monofilaments made by standard PDS ground resin that has been treated to remove fines prior to the pelletization extrusion step. In the experimental section, selected examples describe a preferred PDS strand pelletization process with a ZSK-30 twin-extruder having a screw diameter of 30 millimeters. In addition, examples featuring selected data on 2-0 PDS monofilaments made from standard ground resins relative to monofilaments made by the preferred PDS pelletization process and starting materials are provided as well.

In one embodiment, the present invention is directed to processes for making uniform poly-para-dioxanone (PDS) pellets from a PDS material having non-sieved fines by polymerizing dioxanone monomers in a vessel under an elevated temperature to generate long polymer chains of PDS materials in molten form; discharging the molten PDS materials from the reaction vessel into one or more containers within a second reaction vessel for sufficient time and under appropriate temperature and pressure conditions to cause said PDS material to solidify via solid state polymerization; grinding said solid PDS material into a PDS powder material comprising large granules of PDS and submicron fines; feeding said PDS powder into an inlet for extruder having a cylindrical barrel with one or more screw, at least one outlet and a plurality of temperature zones arranged sequentially a length of the cylindrical barrel from the inlet to the at least one outlet; heating the PDS powder within the extruder to form a flowable PDS mass, conveying said PDS mass along the length of said cylindrical barrel by action of the screw to produce a PDS extrudate in the form of a rod or filament, wherein in the sequential measurable temperature zones along the length of the cylindrical barrel, the PDS powder is subjected to sufficient energy to produce an inverted temperature profile as having a highest measurable temperature in the vicinity of the inlet and a lowest measurable temperature at the die, with each of the remaining sequential measurable temperatures zones having steadily decreasing measurable temperatures from the highest measurable temperature zone to the lowest measurable temperature zone, quenching the PDS extrudate after extrusion from the outlet by either air cooling or in a water bath; cutting the quenched PDS extrudate material to produce uniform PDS pellets.

The PDS mass can be subjected to devolatization by providing the cylindrical barrel with at least one vacuum port for removal of monomer to forming an PDS extrudate having reduced unreacted monomer content relative to the unreacted monomer content introduced into the cylindrical barrel.

In one embodiment, the highest measurable temperature is about 140° C. and the lowest measurable temperature is about 100° C.

In one embodiment, the at least one screw rotates within the barrel at a speed of least 100 revolutions per minute, more preferably the at least one screw rotates within the barrel at a speed of between 100 revolutions per minute and 300 revolutions per minute.

In one embodiment, the PDS extrudate can be quenched after extrusion from the outlet in a water bath having a water bath temperature between 10° C. and 25° C.

In one embodiment, unreacted monomer is removed during processing in the barrel from an originally fed ground resin having between 8% and 10% residual monomer to a level of between 1% and 5% monomer in produced pellets.

In one embodiment, the extruder delivers an average specific energy between 0.210 kw/kg/hr and 0.370 kw/kg/hr.

In one embodiment, the PDS mass has an average molecular weight in the range from 65,000 g/mol to 95,000 g/mol and the extruder delivers an average specific energy between 0.220 kw/kg/hr and 0.330 kw/kg/hr.

In one embodiment, the PDS pellets have a uniform size of about 20 milligrams per pellet (plus or minus 3 milligrams) and a cylindrical shape.

In one embodiment, the PDS pellets have chemical uniformity as demonstrated by a collection of measurements of the intrinsic viscosity from a reasonable sample size having a variability of plus or minus 2%.

In one embodiment, the process further includes the step of drying said pellets to remove moisture and optionally further drying to remove monomer.

In one embodiment, the process can further include the step of incorporating a nuclei favorable dye with dioxanone monomers in the initial molten polymerization reaction vessel to produce a PDS pellet containing a dye.

In one embodiment, the PDS extrudate produced from the preceding processes will exhibit improved consistency of physical properties and sufficient hardness for cutting to produce uniform PDS pellets.

In one embodiment, the processes described above can be utilized to produce PDS pellets to extrude a fiber, and preferably such fibers will exhibit improved burst strength retention relative to the burst strength retention of a corresponding ground PDS resin that has been sieved to remove fines prior to further pellet and fiber processing.

DETAILED DESCRIPTION OF INVENTION

A standard two-stage melt and solid-state polymerization procedure for making PDS resin pellets, as described in U.S. Pat. No. 4,052,988, includes a very short reactor melt synthesis step, which is followed by extended solid state polymerization step at a low curing temperature (typically around 80° C.) in a curing oven. In solid-state polymerization step, it is common to use pucks or reaction vessels to contain and facilitate the polymerization of the material. These pucks are typically made of heat-resistant materials that can withstand the desired temperature and pressure conditions. The purpose of using pucks in solid-state polymerization is to confine the polymer material and create a controlled environment for the reaction to take place. The puck helps to maintain consistent temperature, prevent contamination, and facilitate the desired polymerization process.

Figure 1:
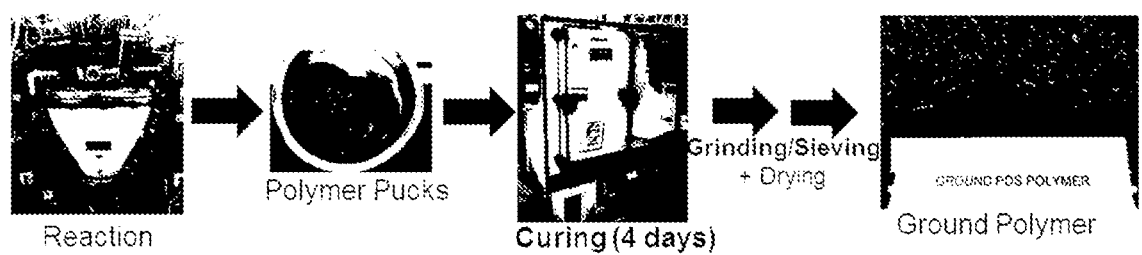
FIG. 1 is a schematic diagram of the polymerization process flow.
Figure 2:
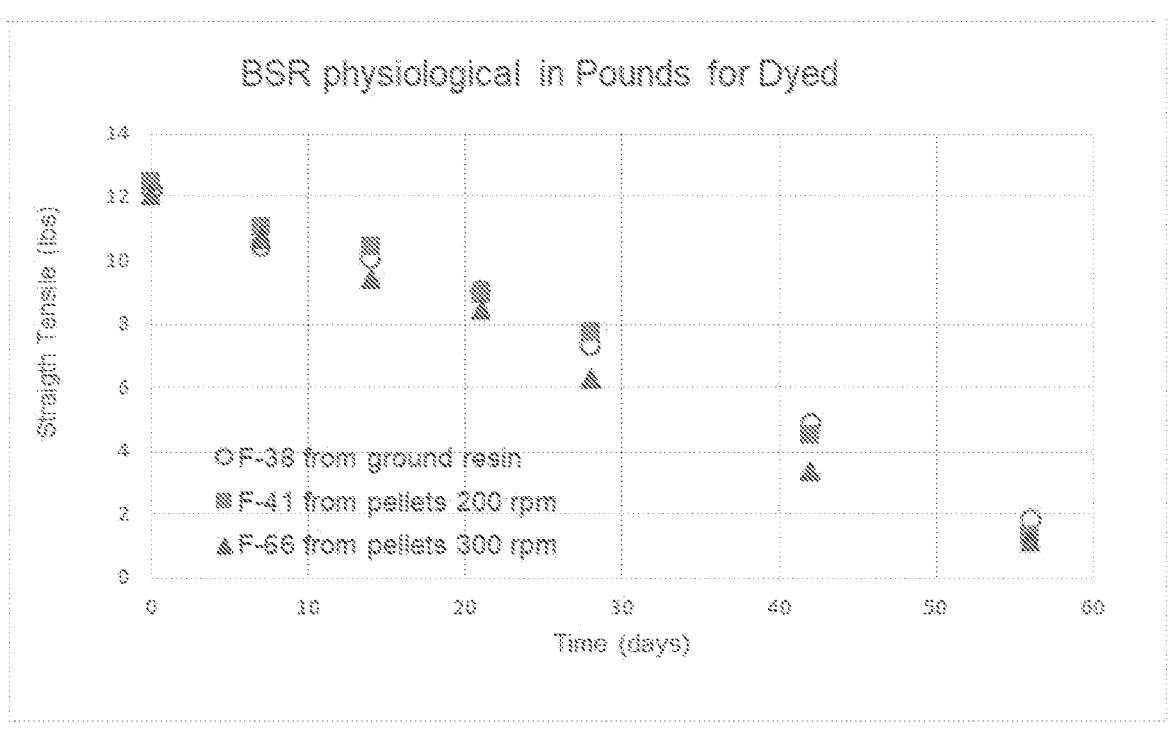
FIG. 2. In vitro BSR Data (in pounds) for 2-0 Dyed Annealed Monofilaments Under Physiological Conditions (37° C./pH=7.27) Produced in Example 3.
Figure 3:
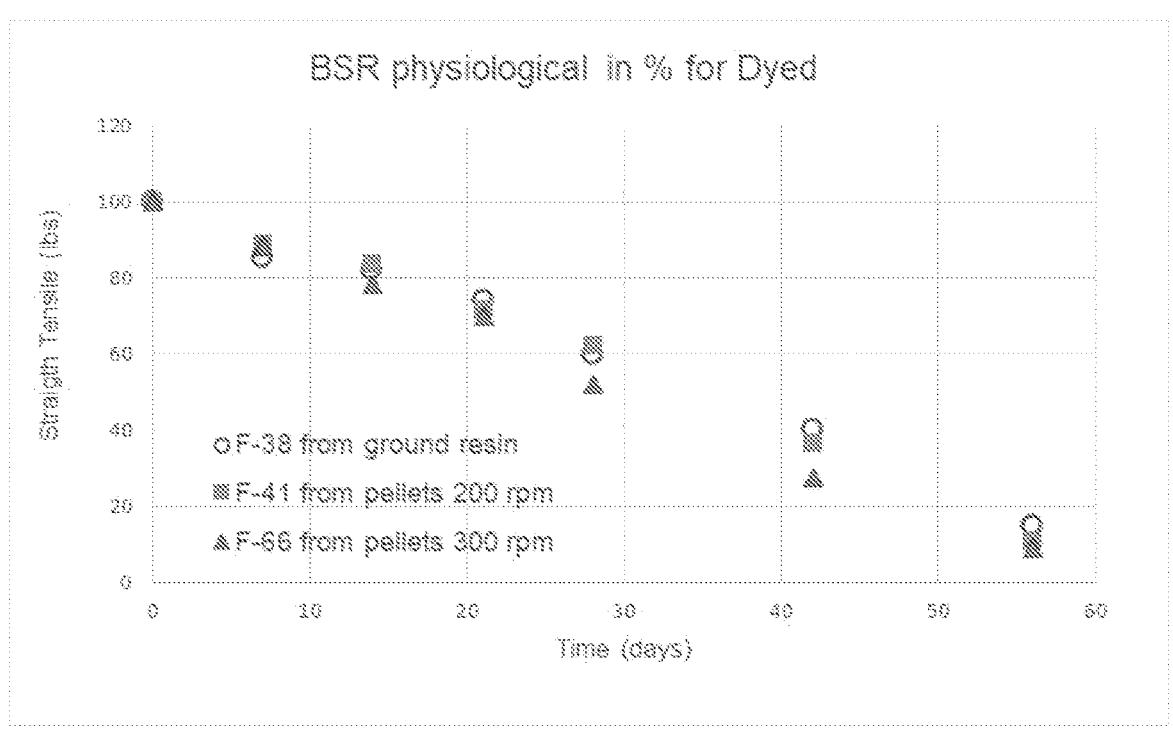
FIG. 3. In vitro BSR Data (in percentages) for 2-0 Dyed Annealed Monofilaments Under Physiological Conditions Produced in Example 3.
Figure 4:
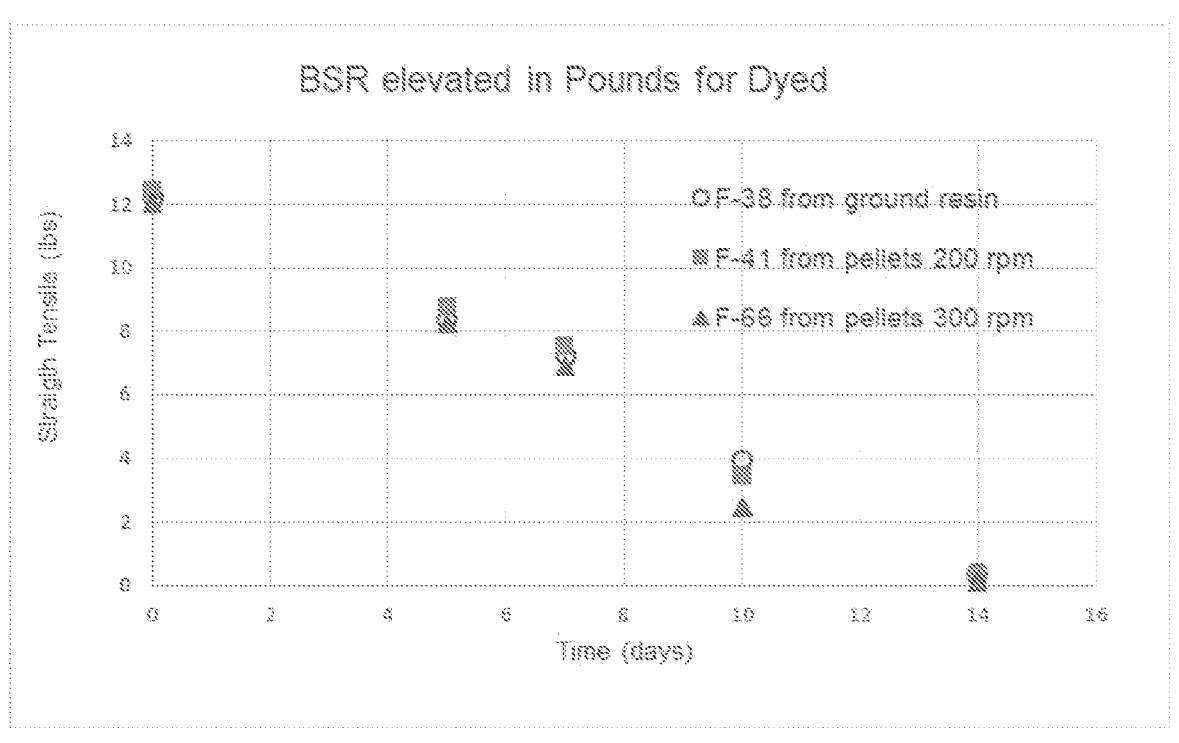
FIG. 4. In vitro BSR Data (in pounds) for 2-0 Dyed Annealed Monofilaments Under Elevated Conditions (55° C./pH=8.98) Produced in Example 3.
Figure 5:
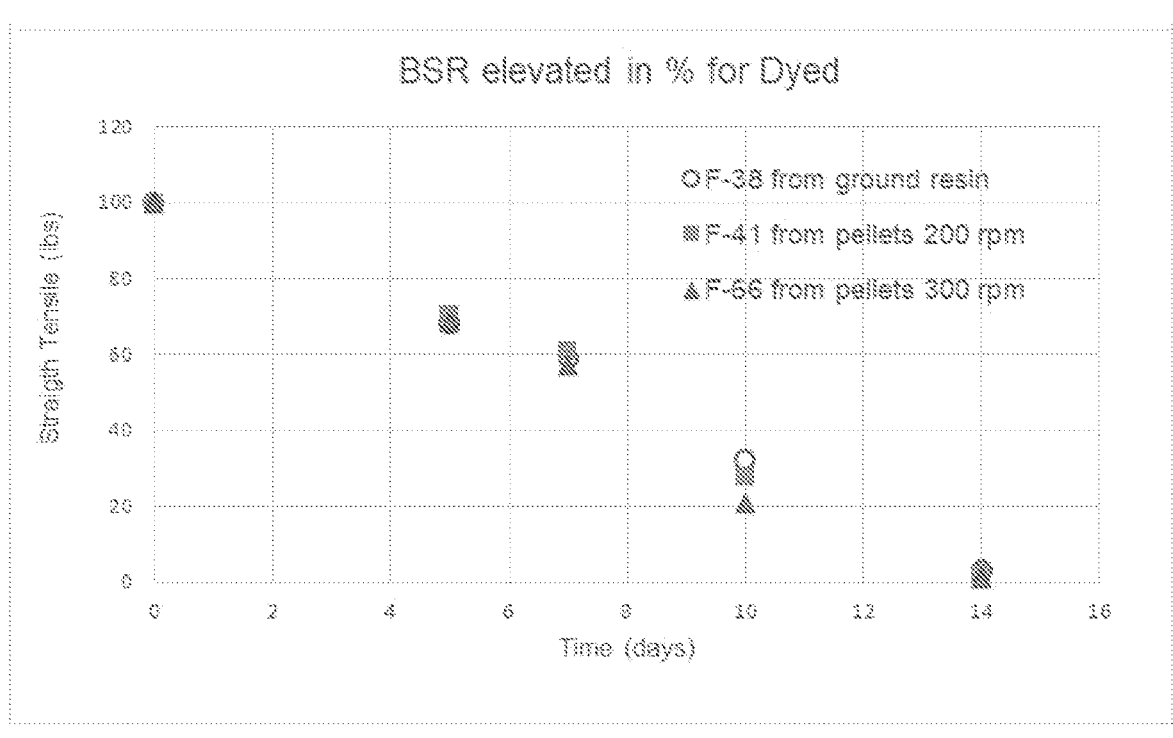
FIG. 5. In vitro BSR Data (in %) for 2-0 Dyed Annealed Monofilaments Under Elevated Conditions (55° C./pH=8.98) Produced in Example 3.

The pucks can be in the form of a sealed container, such as a metal canister or a glass vessel, depending on the specific requirements of the polymerization process. In the standard PDS resin production process, molten PDS materials are discharged into trays early in polymerization, the trays are then put in curing oven at 80° C. for 4 days for solid state polymerization. The sealed puck is then subjected to the desired temperature and other process conditions, allowing the solid-state polymerization to occur within the confined space. The puck helps to prevent the escape of volatile components, control reaction kinetics, and ensure uniform heat distribution throughout the polymer material. After about four to five days of solid-state polymerization, the resulting solidified/crystallized PDS pucks are ground and sieved prior to the final drying step for monomer removal under vacuum and heat. A schematic of a standard PDS synthesis route is displayed in FIG. 1.

After the solid-state polymerization, the polymer is cooled down to room temperature. The cooled polymer is then cut into pellets of the desired length using a pelletizer or similar cutting mechanism. Since the freshly cut PDS pellets may contain residual moisture, a drying step may be employed to remove moisture content. The resulting pellets are spread out on trays or in a drying chamber and subjected to controlled temperature and airflow for drying.

The effects of polymerization materials when subjected to the solid-state conditions may not be uniform, such as the formation of gradients in the materials in each puck along its cross-section as measured by molecular weight or viscosity. The lack of uniformity may be the result of puck location in the oven, the tray height used in the ovens, size of pucks and depth of pucks.

The PDS materials resulting from the solid-state polymerization process are used to generate ground PDS materials, which will include a certain percentage of ground materials in the form of fines. It is customary to remove these fines by sieving, typically resulting in an 8-10% loss of product. The ground materials, less the sieved fines, are then subjected to tumble drying (95° C. for 24 hours) to remove a portion of unreacted monomer (10% monomer reach about 2% unreacted monomer remaining). The drying process, however, can regenerate fines. Using such dried and ground PDS in an extruder can then cause non-uniform extruded products because the residual fines will melt much faster than the large ground materials. Consequently, as described above, some potential disadvantages of generating ground PDS material via conventional melt and solid-state polymerization are poor sample uniformity in the cured solid-state pucks due to thermal conduction and diffusion difficulties, and a presence of fines as a byproduct of a grinding and drying operations.

The present invention describes novel methods for producing PDS pellets starting from solid-state polymerized and ground PDS and its fines without having been subjected to a customary sieve removal step. The ground resin and its fines may contain between about 5 to about 15 percent by weight unreacted PDO monomer, which will be sensitive to the moisture in an air and cause the pellets/resin to degrade (loose molecular weight) in an accelerated pace.

The inventive processes described herein include the step to produce pellets of melt and solid-state polymerized PDS ground resin, including the fines, using a twin screw apparatus. However, the customary process for extruding pellets from PDS materials in a twin extruder was not successful because the resulting extruded materials were too soft, as exemplified by the materials having a low glass transition temperature, low crystallinity, or high residual monomer, the blades are unable to effectively cut the material.

A conventional extrusion process begins with the hopper, which is a funnel-shaped container located at the top of the extruder. The feed material, such as PDS polymer pellets, is loaded into the hopper. The hopper provides a controlled supply of the material to the extruder. A barrel is a long cylindrical chamber that houses the screw or screws, twin screws in this particular process, responsible for moving and melting the feed material. The barrel is heated using heating elements, segments or zones along its length to facilitate the melting and extrusion process. The screws inside the barrel convey, melt, and mix the feed material. The screw consists of flights (thread-like structures) that wrap around a central shaft. As the screws rotate, the feed materials are caused to proceed through the barrel while the screws also apply pressure and generate heat through friction. The barrel is customarily equipped with heater bands or heating elements that maintain the desired temperature for melting the feed material. These bands provide the necessary heat to melt the polymer and maintain it in a molten state throughout the extrusion process. At the end of the barrel, there is a specially designed opening called the die. The die determines the shape and size of the extruded pellets. It contains a small orifice or multiple orifices through which the molten polymer is forced under pressure.

The pelletization extrusion barrel is a robust, cylindrical chamber designed to house the twin screws of the extruder. It is typically made of high-quality, heat-resistant materials, such as hardened steel or corrosion-resistant alloys, to withstand the operating conditions and ensure durability. The barrel is equipped with heater bands or heating elements evenly distributed along its length. These heater bands provide precise and controlled heating to the barrel, maintaining the required temperature for melting the feed material. The number and configuration of heater bands can vary depending on the specific extrusion process and the desired thermal profile. Suitable extruder systems can have ten or more heated zones or configured with as few as four or five heated zones, fewer than four or five zones may be challenging.

Within the barrel, there are two parallel, intermeshing screws known as the twin screws. These screws are precision-engineered and closely fit within the barrel to ensure efficient material processing. The twin screws consist of multiple flight elements, including conveying, kneading, and mixing elements, designed to promote the proper mixing, melting, and transportation of the feed material. The screws are driven by a motor and rotate in opposite directions, generating a strong shearing and mixing action within the barrel. This twin-screw configuration enhances the residence time of the material in the extruder, allowing for improved melting, homogenization, and compounding of the feed material. The barrel is designed with appropriate internal geometry, including grooves, channels, and mixing elements, to optimize the melting and mixing efficiency. It facilitates the heating, melting, and homogenization of the feed material as it progresses along the length of the barrel. The barrel may also feature cooling channels or jackets that enable precise temperature control, especially in processes where temperature-sensitive materials are extruded. These cooling provisions help regulate the temperature of the barrel and ensure optimal processing conditions.

Immediately after the die from the extruder, there is a cutting mechanism that shapes the extruded molten polymer into pellets of the desired length. This cutting mechanism can vary depending on the specific requirements but often involves a rotating knife or blades that precisely cut the molten polymer into cylindrical pellets as it emerges from the die. Once the pellets are cut, a cooling system is employed to rapidly cool them down and solidify them. The cooling system can include a water bath, air cooling, or other cooling methods to maintain the shape and integrity of the newly formed pellets.

The conventional temperature profile for twin screw apparatus along the heat bands starts with a low temperature at the feed that increases along the barrel such that the die as the highest temperature. Applicants discovered that the conventional increasing temperature profile was unable to successfully produce cut PDS pellets from the unsieved PDS solid state polymerizate feed described above.

A flat temperature profile was more effective than the conventional temperature profile but not the preferred profile. Applicants discovered that an inverted temperature profile in which the temperature at the extruder start (feed) is set for a high temp (140° C.) and decreases thereafter along the barrel and extrusion path to a lower temperature at the die (i.e. 100° C.) produces consistent pellet materials. It is not recommended to start with a feed temperature that is greater than 140° C. due to possible degradation of a PDS resin. The starting feed temperature could be lower than 130° C., wherein the feed PDS polymer resins weight average molecular weight is less than or about 70,000 g/mol. Similarly, for a PDS feed polymer resin having weight average molecular weight less than 70,000 g/mol, the low temperature at the die zone could be as low as 90° C., if torque allows. Lower than 90° C. in a die section is not recommended, since the PDS polymer material can solidify at the die and restrict the melt flow.

In certain embodiments, a PDS feed resin material having about 10% unreacted monomer would have a melting point of about 95° C. A pelletized resin with about 2% residual monomer produced without a drying step could have melting point around 106° C. Pelletized polymers that have been subjected to annealing/drying steps PDS resin can reach melting points of up to 115° C.

It is possible, without intending to be bound to any theory, that the presence of some nuclei helps extruded material to crystallize as it exits the die into a water bath, leading to greater material crystallinity and a harder resulting extrudate, which is easier to cut). Applicants believe that an inverted temperature profile, with the colder die or colder sections of the extruder, allows the resin to retain nuclei, which consequently helps the extruded PDS material to crystallize faster upon exiting the die orifice and entering the water bath. The water bath has dual function. First, it can quench the extrude and make it colder/harder and thus easier to cut. Second, it may provide additional nuclei, and promote crystallization, which also helps the material getting harder and easier to cut.

The preferred extrusion process also incorporates one or more ports along the extrusion pathway, preferably two ports that can generate a vacuum in the barrel. The vacuum ports can allow for the removal of unreacted monomer, with untreated ground PDS resin having about 8% to 10%, and, preferably ending up after pelletization with about 1% to 5% of residual monomer, depending on throughput rate. The use of such vacuum ports can eliminate or reduce the need for a subsequent drying step, so as to reduce drying times completely or to have a drying time of twelve hours instead of drying for twenty-four or more hours.

Some extrusion operational controls and device configuration contribute to final desirable extrusion results and consequently to improved pellet production rates and properties. Rotational characteristics of twin screw extruders, for example, play a crucial role in determining the processing conditions, material transport, and mixing capabilities of the extruder.

Screw speed refers to the rotational speed at which the twin screws of the extruder rotate. It is typically measured in revolutions per minute (rpm) and can be adjusted to control the residence time of the material in the extruder and the output rate of the extruded product. The screw speed can vary depending on the specific application, material being processed, and desired processing conditions. In a preferred embodiment of the present invention, the preferred screw speed is between 100 rpm and 300 rpm, depending on resin's molecular weight and throughput rate.

The screw configuration describes the arrangement and design of the individual elements on the twin screws. The configuration includes the number, shape, and orientation of the conveying, kneading, and mixing elements along the screws. The selection of a specific screw configuration depends on the desired processing objectives, such as increased mixing efficiency, enhanced material transport, or improved melting capabilities.

Forward-Conveying elements are primarily responsible for moving the material forward along the screw channels. They have a conveying function rather than a mixing function, pushing the material from the feed end towards the discharge end of the extruder. Kneading blocks are robust elements with multiple intermeshing protrusions or flights that resemble kneading paddles. These elements generate significant shearing and mixing forces by pushing the material against the barrel and other screws, effectively kneading and blending it. Kneading blocks help improve the distributive mixing and dispersion of additives, fillers, and other components throughout the material.

Mixing pins or distributive elements consist of pins or pegs that extend radially from the screw surface and aid in the distributive mixing of the material by intensifying the interaction between the material and the screw channels. The pins create additional shear forces and turbulence, promoting thorough mixing and dispersion of components. Reverse-flight elements have a reverse helical shape compared to the forward-conveying elements causing the material to reverse direction and circulate within the extruder. This circulation helps improve mixing and promotes the exchange of materials between different screw channels.

Barrier elements are typically positioned opposite to the conveying elements to create barriers or dams that restrict the flow of material along the screw channels. These barriers increase the residence time of the material within the extruder, facilitating more extensive mixing and promoting the dispersion of additives or fillers. Distributive mixing elements are designed to enhance the distribution of materials across the width of the extruder, ensuring uniform mixing and blending. These elements typically consist of ridges, grooves, or variations in the screw channel geometry that promote lateral movement of the material, leading to improved mixing performance.

Twin screw extruders can have either intermeshing or non-intermeshing screws. Intermeshing screws have interlocking elements that mesh together as they rotate, creating a tight seal and enhancing material transport and mixing efficiency. This intermeshing characteristic allows for higher conveying and shearing forces, resulting in improved material compounding and homogenization. Additionally, twin screws can rotate in either co-rotating or counter-rotating directions. Co-rotating screws rotate in the same direction, while counter-rotating screws rotate in opposite directions.

Torque and Power Consumption: The rotational characteristics of the twin screws, including their speed and resistance to material flow, determine the torque and power requirements of the extruder. Higher torque may be needed to process materials with high viscosity or when increased shearing forces are necessary. Monitoring and controlling torque and power consumption are important for optimizing processing efficiency and preventing excessive energy usage.

Each barrel section of an extruder can be divided into distinct zones that serve specific functions during the extrusion process. These zones commonly include the feed zone, mixing zone, venting zone, and pumping zone. The feed zone is the initial section of the barrel where the material, such as pellets or powder, is introduced into the extruder through the hopper. The primary function of the feed zone is to convey the material forward and facilitate its entry into the screw flights. This zone typically has a larger barrel diameter to accommodate a higher material volume and promote good feeding efficiency.

The mixing zone follows the feed zone and is responsible for thorough blending, melting, and homogenization of the material. It contains various mixing elements, such as kneading blocks, mixing pins, or distributive elements, which facilitate intensive mixing and dispersive action. The mixing zone ensures the uniform distribution of additives, fillers, and other components, resulting in a consistent and homogenous melt.

The venting zone, when present, is designed to remove volatiles, gases, or moisture from the material as it progresses through the extruder. It typically features vents or openings that allow the escape of trapped air or volatile components. The venting zone helps prevent defects, such as bubbles or voids, in the final extruded product by facilitating the release of trapped gases or moisture.

The pumping zone, also known as the metering zone, is the final section of the barrel before the material reaches the die. In this zone, the extruder exerts pressure on the molten material, enhancing its flow and pumping it through the die opening. The pumping zone ensures consistent material flow and pressure, facilitating precise control over the extruded product dimensions and shape.

The specific length and configuration of each zone may vary depending on the application, material characteristics, and desired extrusion outcomes. The preferred extrusion screw system will have been five and ten zone or units. Additionally, the length of the entire barrel containing the twin screws can be subdivided into discreet segments. Each segment is characterized by having mixing and heating capability, pumping the melted resin through the barrel. Some of the segments on barrel can have vacuum ports that helps removing residual monomer.

The extruded polymer material can be cooled prior to proceeding as a strand into cutting operations. The choice of cooling method depends on factors such as the type of polymer, production requirements, and desired product properties. Water bath cooling involves immersing the extruded polymer in a bath or tank filled with cool water. The extruded product passes through the water bath, where it is rapidly cooled and solidified. Water temperature and flow rate can be adjusted to control the cooling rate and ensure uniform cooling across the product.

Air cooling is a widely used method where cool air is directed onto the extruded polymer to facilitate cooling and solidification. It typically involves the use of fans or blowers to circulate ambient air around the extruded product. Ambient cooling refers to the natural cooling of the extruded polymer in the surrounding environment without the use of any additional cooling mediums. This method relies on the convective heat transfer between the hot extruded polymer and the surrounding air. Cooling rollers or conveyor belts can be employed to facilitate the cooling of the extruded polymer. The hot extruded product comes into contact with the cooled rollers or conveyor belt, which helps absorb heat and dissipate it. This configuration allows for continuous cooling of the extruded polymer as it moves along the rollers or conveyor belt. Spray cooling involves directing a fine mist or spray of cool water or other cooling fluids onto the extruded polymer. The spray helps rapidly cool the surface of the extruded product, promoting solidification. Spray cooling is often used in conjunction with other cooling methods to enhance the cooling rate and achieve efficient cooling of the extruded polymer.

Partially molten PDS material in an extruder will initially posses a plurality of nuclei or clusters of nuclei. The formation of nuclei refers to the initial formation of small clusters of polymer chains, known as polymer nuclei (seeds) or crystallization centers. These nuclei serve as the starting points for the growth of the crystalline chains and eventually lead to the formation of a larger crystallization network, such as spherulites. Nuclei formation can have a significant impact on the crystallinity level of the final polymer product. Crystallinity refers to the degree of order in the arrangement of polymer chains within a solid material.

A polymeric environment having high nucleation density and rapid crystallization typically results in the formation of a highly crystalline polymer. The numerous nuclei provide more sites for crystalline growth, and the rapid growth allows for the alignment and packing of polymer chains in an ordered manner. This leads to the formation of a higher degree of crystallinity in the final product. Nucleating agents aid in the formation of nuclei during the crystallization process. These nucleating agents promote the formation of a crystalline structure within the polymer, which can enhance various properties such as crystallinity, thermal stability, and mechanical strength. Some common nucleating agents used in PDS systems include inorganic materials like talc, clay, or metal oxides (such as titanium dioxide). Certain organic compounds can act as nucleating agents in PDS systems, such as benzoic acid or stearic acid, or other organic additives designed to induce nucleation and control the crystalline structure.

The presence of a dye, particularly dyes having chemical structures or functional groups having an affinity for the PDS monomer that allows them to act as effective nucleating agents, is believed to induce a seeding effect relative to undyed polymeric materials. Dyes that lead to more rapid nucleation and crystallization behavior are termed as "nuclei favorable". Hence, the presence of nuclei favorable dyes can increase the crystallization rate of PDS resin, making it solidify/harden faster than in absence of a dye. Because of that, lower zone temperatures, particularly at the start feed and die end zone segments needs to be applied to preserve more nuclei prior to entering a water bath for a natural (undyed) material relative to some dye-containing PDS extruded materials.

Physical uniformity can be demonstrated by observing substantially uniform shaped and sized pellets, preferably as cylindrical pellets having on average a weight of about 20 mg (plus or minus 3 mg). Chemical uniformity can be demonstrated by measurement of the intrinsic viscosity of the polymer material as being substantially the same between pellets, plus or minus 2%. Test methods for such properties are provided below.

PDS pellets are frequently employed in fiber extrusion systems to produce filaments, such as for suture or mesh products. It is essential that such medical products have consistent properties from batch to batch and within each batch of feed materials. Feed material that lacks physical or chemical uniformity may exhibit a loss of fiber strength and/or an unexpectedly diminished BSR, breaking strength retention (tensile strength of suture after hydrolysis either in vitro or in vivo).

Test Methods and Properties:

Different characterization methods, described below, were used to measure key properties of the inventive and comparative PDS ground resin, pellets and their fibers to support this application, calorimetric data were generated on a TA Instruments' Differential Scanning calorimeter, DSC Model 2910 MDSC, using dry $N_2$ as a purge gas. Typically, about 5-10 mg of a polymer resin, pellet or a fiber was placed in an aluminum pan, secured by a lid (cover), and positioned in the autosampler holder area of the instrument. Two types of non-isothermal conditions are employed: a) First heat scan: a polymer or a fiber was quenched to −80° C., followed by the constant heating rate at 10° C./min up to 140° C.; and b) Second heat scan: after melting of a sample at 140° C. for three minutes, a polymer or a fiber was quenched below its glass transition temperature (−80° C.), followed by the controlled heating step with the constant rate of 10° C./min. The first heat scan data are indicative of "as is" properties of a sample and, as such, largely dependent on its thermal history. The second heat data, on the other hand, are independent of thermal history of the sample and are a function of the inherent properties of the sample (chemistry, molecular weight, monomer level, etc.). From the first heat scan data, in addition to the glass transition temperature and melting point, the heat of fusion, ΔHm, as an area under the melting peak and expressed typically in J/g, can be obtained. Heat of fusion is directly proportional to the level of crystallinity in a sample.

Morphological data were obtained by conventional Wide Angle X-Ray Diffraction (WAXD) analysis. The WAXD measurements of a dried resin or a fiber were carried out on a Siemens Hi-Star™ unit using CuKα radiation at a wavelength of 1.542 Å. The instrument was operated at 40 kV and 40 mA with a collimator size of Ø 0.5 mm. The convolution of the X-ray images and the calculation of crystallinity content were conducted using the DIFFRAC PLUS™ software developed by Siemens.

Inherent viscosity, IV measurements were conducted in hexafluoroisopropanol, HFIP at 25° C. and at a concentration of 0.10 g/dL. The molecular weight measurements were performed using Gel Permission Chromatography equipped with Wyatt's Optilab rEx refractometer and Wyatt's HELEOS II multi-angle laser light scattering detector. During the measurements, PL HFIP gel columns were maintained at 40° C., with a mobile phase consisting of HFIP with 0.01M LiBr (0.2% $H_2O$) operating at the flow rate of 0.7 ml/min.

Gel Permeation Chromatography (GPC) data were collected on Waters 2695, Wyatt Optilab rEx Refractometer, using Wyatt HELEOS II Multi-angle Laser Light Scattering Detector. Empower and Astra software were used for data analysis. Two PL HFIP gel columns were used operated at 40° C., and HFIP with 0.01 M LiBr (0.2% $H_2O$) as a mobile phase. Flow rate was 0.7 mL/min with injection volume of 70 μL. Solution concentration was approximately 2 mg/mL.

The Nuclear Magnetic Resonance, NMR method identifies and determines the chemical composition of polymer ground resins, pellets and fibers using proton nuclear magnetic resonance ($^1$HNMR) spectroscopy. The instrument used was the 400 MHZ (9.4 Tesla) Varian UnityINOVA NMR Spectrometer; an appropriate deuterated solvent, such as Hexafluoroacetone sesquideuterate (HFAD) of at least 99.5% purity D (ETHICON ID #2881, CAS 10057-27-9) was used. Sample preparation: In triplicate, 6-10 mg of each sample was weighted and placed into separate 5 mm NMR tubes. Under nitrogen gas in a glove box, 300+/−10 μL of HEAD was added using 1000 μL syringe, to each NMR tube and cap. Meanwhile, a solvent blank was prepared. The samples were then removed from the nitrogen glove bag/box and NMR tube(s) were placed in a sonic bath, and sonicated until the sample was dissolved, and no evidence of solid polymer existed. Subjecting the samples again under the nitrogen flow, 300+/−10 μL benzene-d6 was added using a 1000 μL syringe to each NMR tube and capped. The tubes were shake well to ensure uniform mixing of the HFAD and benzene-d6 solvents.

Mechanical properties of the fibers (size 2-0 monofilaments) after post-processing, including hydrolysis treatment, such as straight tensile and knot tensile strength (one simple knot in the middle) were measured by the Instron tester. The Instron model was ID #TJ-41, equipped with 100-lb load cell LC-147 with pneumatic grips at clamping pressure around 60 psi. For the regular tensile measurements of non-hydrolyzed (time zero) samples, steel faces were used on the Instron machine. The gage length was 5 inches; a sampling rate of 20 pts/secs with a crosshead speed of 12 in/min was employed. The full-scale load range was 100 lbf. For hydrolysis testing (Breaking Strength Retention, BSR measurements), rubber faces were used to avoid slippage. The fiber diameters were measured using Federal gauge (Products Corp. Providence, RI) model #57B-1, identification #W-10761.

In vitro BSR measurements were conducted at physiologically relevant in vitro conditions: 7.27 pH phosphate buffered saline solution with molarity of 0.01M (1×) maintained at 37° C. temperature. Two Haake water baths equipped with a ThermoScientific DC10 motor (Model W46, equipment ID: BT-029) were used. The data for BSR evaluations were given in pounds and percentages. At specified time points, the tensile strength of samples was tested using an Instron material testing machine. The test parameters were 1 inch gauge length and 1 inch per minute crosshead speed. In addition, in vitro BSR measurements can be conducted using elevated in vitro conditions: 8.98 pH phosphate buffered saline solution with molarity of 0.01M (1×) maintained at 55° C. temperature.

The water content in PDS pellets were obtained using Computrac VaporPro Moisture Analyzer (Arizona Instruments LLC, AZ). The instrument utilizes a cylinder-shaped bottle heater, a dry air-carrier gas flow system and a moisture sensor. The instrument heats the sample (recommended 10° C. below its glass transition temperature) contained in a 25 ml septum vial. Volatiles driven from the sample are carried by the air system through the Sensor Block containing a Relative Humidity (RH) sensor. The reading from this sensor is combined with the sensor block temperature and carrier gas flow rate in a microprocessor to generate a measurement of the moisture content in the sample. A typical procedure for measuring the water content in pellets follows. After performing a dryness test and calibrating the RH sensor, about 1 g of pellets (accurately measured by an analytical balance) is placed into a glass septum vial. The sample in the vial is then inserted in the instrument, which is preheated at 90° C. and the measurements of released water is begun. At the end of the run the following parameters are displayed on the screen: the water content in parts per million (ppm), total amount of water released in micrograms, and exposure time in minutes. Typically, the test lasts from about 5 to 10 minutes, depending on the sample weight: larger samples take longer time for all the water to be released form a sample.

The following examples are illustrative of the principles and practice of the present invention, although not limited thereto. Numerous additional embodiments within the scope and spirit of the invention will become apparent to those skilled in the art once having the benefit of this disclosure.

REFERENCE EXAMPLE

PDS polymer prepared by standard synthetic procedures as described in U.S. Pat. Nos. 4,052,988, 5,717,059, and 6,448,367B1 could not be pelletized by a strand-pelletization procedure. In addition, bimodal polymer blends of PDS, as described in U.S. Pat. Nos. 8,236,904, and 8,450,431, despite having enhanced crystallization properties and a low level of residual monomer, failed to pelletize using a standard, strand-pelletization technique using a ZSK-30 twin extruder.

Due to the "soft" nature of PDS polymer materials prepared above and inability of the resulting polymer materials to crystallize fast enough in the water troughs, the resin stuck to the die, making it very difficult to maintain uniform strand diameter, with many breaks occurring at the die. Even when part of the strands made it to the pellet cutter, the strands were difficult to cut because of the "soft" PDS, and the resulting pellets (if any) were not of the desired length or shape. Due to these difficulties, efforts to pelletize materials from the PDS ground resin described above were not considered successful.

Details of the Procedure with Failed Parameters

The pelletizer used was a Reduction Engineering Model 604 unit. The unit was a co-rotating intermeshing pair of screws with a 30:1 length to diameter (L/D) ratio consisting of nine (9) segments with one (1) venting zone located one segment length away from the die. These are metal hollow blocks that can be arranged in a series around the two screws to make a desired barrel length. The full length of screw section comprises of a feed, mixing, venting and pumping zone. For feeding purposes 3.5D, a total of 14% mixing elements, separated into a mixing zone and a venting seal, 3D is used for venting and 3.5D is used for pumping.

The molten polymer or bimodal polymer blends were forced out of a ZSK-30 extruder by pressure through a multi-hole die and passed through two water baths (troughs) in a row, filled either with cold or hot water (20 to 70° C.). The strands were then fed into the pelletizer, which pulls the strands at a given speed based on desired size. The pelletizer has several rotating blades travelling the same speed as the puller motor. In a "good" case, the strands remain uniform in size throughout the process, from the die through the water troughs and into the pelletizer, generating at the end uniform pellets.

For PDS strand-pelletization, the extruder zone temperatures were set between 100° C. and 160° C. throughout all five zones (gradual increase in temperature towards the end zone), having rotator speeds varying between 175 and 225 RPM, while the batch temperature was maintained between 130° C. and 175° C., and torque values between 45 and 55 Nm. Water troughs temperature was maintained at 22° C. As noted previously, using the above processing conditions pelletization failed as the polymer was not able to cut, wrapping around a die fixture. The PDS-based polymer appeared to be too soft and the overall process and materials were considered to be unsuccessful.

Example 1. Use of ZSK-30 Twin Screw Extruder Conditions for Strand Pelletization of Ground PDS Resins and its Fines—Low Throughput Studies Poly (p-dioxanone) (PDS) polymer was made by partially polymerizing (p-dioxanone) (PDO) in 15-gallon reactor. Monomer (PDO), Catalyst (Stannous Octoate, Monomer to catalyst ratio 43,875:1) and Initiator (Dodecanol, Monomer to Initiator ratio from 700:1 to 1,100:1) and Dye (only for dyed polymer, 0.1 weight % D&C Violet #2) were charged to reactor and heated to 95° C., to begin polymerization. Once the prepolymer reaches a minimum viscosity in reactor, measured using Brookfield viscometer, it is then discharged from the reactor into Teflon coated pie pans, which were subsequently placed in a curing oven where polymerization continued at approximately 80±5° C. for 95±2 hrs. under nitrogen purge. Once curing is completed, the PDS polymer "pucks" are removed from the trays and ground to achieve granules of an appropriate size. The resulted granules along with fines are tumbled under vacuum at ambient temperature in 'V' shape dryer to remove moisture for several hours. This moisture free granules and fines are then placed in cans and sealed under vacuum until to be used for extrusion process.

This example describes the inventive ZSK-30 pelletization of PDS ground resins and its fines, using the polymer throughput rates between 5 lbs./h (2.2 kg/h) to 10 lbs./h (4.5 kg/h).

The twin extruder used was ZSE Micro 27 mm (Leistritz Corporation) with a 40 L/D co-rotating intermeshing screw and comprised of 10 barrels. The screw design includes a feeding, mixing, two venting and a pumping zone.

The following study shows an effect of extruder temperature profile on the pelletization of PDS resin. As in previous example, a conventional temperature profile did not work. In Table 1, a wide variety of twin extruder parameters were listed for pelletization of ground, but non-sieved PDS resin. Control A, Control B, and Control C samples in Table 1 are those obtained with no vacuum pulled on either port.

TABLE 1

Effect of Twin Extruder Temperatures, RPMs, and Quenching Media on Pelletization of Ground, but non-Sieved PDS Resin

| Sample ID | RPM | Melt Temp (° C.) | Pressure (psi) | Feed rate (lbs./h) | Vac port 1 (Torr) | Vac port 2 (Torr) | Water bath time (sec) |
|---|---|---|---|---|---|---|---|
| Control A | 100 | 137 | 420 | 5 | atm | atm | 160 |
| Control B | 100 | 116 | 550 | 5 | atm | atm | 160 |
| Control C | 55 | 115 | 650 | 5 | atm | atm | 160 |
| Sample 1 | 55 | 115 | 650 | 5 | 29 | 28 | 160 |
| Sample 2 | 55 | 126 | 500 | 5 | atm | atm | 160 |
| Sample 3 | 55 | 125 | 450 | 5 | 29 | 28 | 160 |
| Sample 4 | 55 | 135 | 408 | 5 | 29 | 28 | 160 |
| Sample 5 | 55 | 135 | 408 | 5 | 29 | 28 | 160 |
| Sample 6 | 110 | 130 | 600 | 10 | 29 | 28 | 246 |
| Sample 7 | 110 | 127 | 600 | 10 | closed | 28 | 246 |
| Sample 8 | 220 | 123 | 540 | 10 | closed | 28 | 246 |
| Sample 9 | 220 | 123 | 450 | 5 | closed | 28 | 246 |
| Sample 10 | 180 | 122 | 650 | 10 | 20 | 28 | 246 |
| Sample 11 | 110 | 103 | 900 | 10 | 29 | 28 | 246 |
| Sample 12 | 110 | 104 | 890 | 10 | 29 | 28 | 133 |
| Sample 13 | 220 | 103 | 700 | 10 | 28 | 27 | 133 |
| Sample 14 | 220 | 126 | 550 | 10 | 28 | 27 | 133 |
| Sample 15 | 220 | 112 | 630 | 10 | 30 | 29 | 133 |
| Sample 16 | 220 | 111 | 610 | 10 | 30 | 29 | 133 |
| Sample 17 | 220 | 100 | 700 | 10 | 30 | 29 | 133 |
| Sample 18 | 400 | 102 | 600 | 10 | 30 | 29 | 133 |
| Sample 19 | 100 | 98 | 680 | 5 | 27 | 26 | 0 |
| Sample 20 | 200 | 100 | 550 | 5 | 29 | 28 | 0 |
| Sample 21 | 200 | 101 | 550 | 5 | 29 | 29 | 0 |

TABLE 1A

Experimental Conditions in Twin Extruder at Ten Heated Zones

| Sample ID | Zone 1 | Zone 2 | Zone 3 | Zone 4 | Zone 5 | Zone 6 | Zone 7 | Zone 8 | Zone 9 | Zone 10 (at die) | Comments |
|---|---|---|---|---|---|---|---|---|---|---|---|
| Control A | 100 | 100 | 105 | 110 | 115 | 120 | 125 | 130 | 135 | 140 | No pellets, failed; resin too soft for cutting |
| Control B | 76 | 77 | 88 | 88 | 88 | 99 | 99 | 100 | 99 | 100 | Rigid extrudate, non-uniform cutting |
| Control C | 77 | 77 | 98 | 98 | 99 | 99 | 99 | 99 | 100 | 99 | Rigid extrudate, non-uniform cutting |
| Sample 1 | 77 | 77 | 98 | 98 | 99 | 99 | 99 | 99 | 100 | 99 | Rough surface, non-uniform cutting |
| Sample 2 | 77 | 77 | 110 | 109 | 110 | 110 | 110 | 109 | 110 | 114 | Smoother surface, still poor pellet quality |
| Sample 3 | 77 | 77 | 110 | 110 | 110 | 110 | 110 | 110 | 110 | 110 | Smoother surface, non-uniform pellets |
| Sample 4 | 77 | 77 | 120 | 121 | 120 | 120 | 120 | 120 | 119 | 123 | Smooth surface, difficulties in cutting |
| Sample 5 | 77 | 77 | 120 | 120 | 120 | 120 | 120 | 120 | 120 | 120 | Non-uniform pellets |
| Sample 6 | 77 | 77 | 120 | 119 | 120 | 120 | 120 | 119 | 120 | 121 | Non-uniform pellets |
| Sample 7 | 77 | 77 | 120 | 120 | 120 | 120 | 121 | 119 | 120 | 120 | Non-uniform pellets |
| Sample 8 | 77 | 77 | 120 | 120 | 120 | 120 | 120 | 120 | 120 | 120 | Non-uniform pellets |
| Sample 9 | 77 | 77 | 120 | 120 | 120 | 120 | 120 | 121 | 119 | 120 | Non-uniform pellets |
| Sample 10 | 122 | 133 | 133 | 120 | 120 | 120 | 120 | 120 | 120 | 120 | Flat T profile, more uniform pellets' size and shape |
| Sample 11 | 122 | 133 | 133 | 134 | 120 | 120 | 119 | 111 | 100 | 98 | Reverse T profile, pellets' size and shape appear uniform |
| Sample 12 | 122 | 132 | 133 | 133 | 120 | 120 | 120 | 110 | 100 | 100 | Reverse T profile, pellets' size and shape appear uniform |
| Sample 13 | 122 | 133 | 133 | 134 | 120 | 120 | 120 | 111 | 100 | 101 | Worse pellet quality than Sample 12 |
| Sample 14 | 122 | 140 | 141 | 140 | 140 | 133 | 132 | 133 | 122 | 127 | Poor pellet quality, large distribution of pellets' size and shape, worse than Sample 13 |
| Sample 15 | 80 | 80 | 110 | 110 | 110 | 110 | 111 | 111 | 110 | 110 | Water bath T = 40° C., pellets' size and shape more uniform than Sample 14, but still with a lot of variations |
| Sample 16 | 80 | 80 | 110 | 110 | 110 | 110 | 110 | 110 | 110 | 110 | Water bath T = 40° C., non-uniform cutting |
| Sample 17 | 122 | 133 | 132 | 133 | 120 | 120 | 121 | 111 | 99 | 98 | Water bath T = 40° C., good pellets with uniform size and shape |
| Sample 18 | 122 | 132 | 133 | 133 | 120 | 120 | 119 | 110 | 101 | 99 | Water bath T = 40° C., good pellets with uniform size and shape |
| Sample 19 | 122 | 134 | 133 | 134 | 119 | 120 | 119 | 111 | 99 | 100 | Air dry with long conveyor, good pellets; cooling belt time = 326 sec |
| Sample 20 | 122 | 133 | 133 | 133 | 120 | 120 | 120 | 110 | 100 | 100 | Air dry with long conveyor, good pellets; cooling belt time = 326 sec |
| Sample 21 | 122 | 112 | 112 | 100 | 101 | 100 | 99 | 100 | 100 | 100 | Air dry with long conveyor, good pellets; cooling belt time = 326 sec |

For the Sample 21 describing air dry quenching with a cooling belt, the retention in screw zone was calculated to be about 140 seconds, cooling belt exposure time was 326 seconds, with 5 wraps total. Water bath dimensions for water quenched experiments were: 12 ft length×20 width, with 1 loop/pass of about 8 ft long.

As indicated in Table 1 and 1A and supported by earlier experiments, pelletization of PDS ground resin using standard, increasing temperature profile from the feeding zone to the die did not work. A flat temperature profile (Sample 10) showed a marginal improvement. Most surprisingly, when the reversed temperature profile was utilized (Samples 11, 12, 17-21), a significant improvement in pellet quality was observed.

Two quenching media was used-water and dry air (Samples 19-21). Based on data in Table 1 and 1A, both cooling methods could produce satisfactory results. However, cooling belt exposure time needed to be much longer for air dry experiments compared to exposure times in water media. Both, cold (15-22° C.) and warm (40° C.) water baths were used (Samples 15-18). Although warm water conditions produced better quality pellets, some negative effect for this type were noted during analytical examination.

To understand the effect of different twin extruder conditions on polymer properties, the samples were submitted for GPC, IV, NMR, and moisture (VaporPro) testing. Summary of analytical data are given in Table 2 below.

Control 0 sample in Table 2 is the ground, not sieved PDS resin used to start ZSK-30 extrusion.

moisture, which is comparable to 275 ppm of the original PDS ground resin. Such high level of moisture in warm bath pellets would cause degradation during storage before samples are being submitted for analytical testing. Due to these moisture concerns, a cold-water bath (10° C.-20° C.) was used exclusively in future studies.

TABLE 2

Analytical data for the Samples Described in Table 1.

| Sample ID | Conditions | RPM | Monomer (mole %) | Mw (g/mol) | IV (dL/g) | Moisture (ppm) |
|---|---|---|---|---|---|---|
| Control 0 | PDS ground, not sieved resin | NA | 9.15 | 72,800 | 1.63 | 275 |
| Control B | no vacuum, cold zone increasing (regular) T profile | 100 | 8.45 | 63,800 | 1.49 | NA |
| Control C | no vacuum, cold zone | 55 | 7.65 | 72,400 | 1.64 | NA |
| Sample 1 | cold zone with vacuum, increasing T profile | 55 | 8.63 | 63,200 | 1.50 | NA |
| Sample 5 | zone 120° C., rate 5 lbs./h | 55 | 7.55 | 68,200 | 1.54 | NA |
| Sample 6 | 120° C., 10 lbs./h | 110 | 7.69 | 73,700 | 1.64 | NA |
| Sample 8 | 10 lbs./h, one vacuum port closed, increasing T profile | 220 | 5.53 | NA | NA | NA |
| Sample 9 | 5 lbs./h, one vacuum port closed, increasing T profile | 220 | 4.74 | NA | NA | NA |
| Sample 10 | 10 lbs./h, full vacuum, Flat (same T in all zones) T profile, Sample collected (water = 246 sec) | 180 | 5.47 | 78,100 | 1.80 | 1,443 |
| Sample 12 | 10 lbs./h, full vacuum, Reverse T profile (highest T in zone 1 with gradual decrease in next zones), Sample collected (water = 133 sec) | 110 | 8.29 | 76,600 | 1.72 | 1,376 |
| Sample 13 | Zone 1 started with 120° C. then Reversed with lower temperature in each zone | 220 | 8.05 | NA | NA | NA |
| Sample 14 | Zone 1 started with 140° C. then Reversed | 220 | 7.50 | 68,700 | 1.57 | NA |
| Sample 16 | warm bath 40° C., Flat zone 110° C., 10 lbs./h | 220 | 7.24 | 54,500 | 1.29 | 3,685 |
| Sample 17 | warm bath 40° C., zone 120° C. Reversed | 220 | 6.88 | 58,100 | 1.36 | 2,983 |
| Sample 18 | warm bath 40° C., zone 120° C. Reversed | 400 | 5.40 | NA | NA | NA |
| Sample 19 | Air quench; zone 120° C. Reversed, 5 lbs./h | 100 | 8.27 | NA | NA | NA |
| Sample 20 | Air quench; zone 120° C. Reversed, 5 lbs./h | 200 | 7.29 | 74,200 | 1.68 | NA |
| Sample 21 | Air quench; Zone 1 started with 100° C. and then Reversed profile, Sample collected; (belt residence = 326 sec) | 200 | 7.71 | 74,700 | 1.72 | 345 |

Focusing on polymers' weight average molecular weight and inherent viscosity (IV), most pellets from this study showed no polymer degradation compared to original resin (Control 0) under various processing conditions, except those quenched in warm water bath (Samples 16-18). The reason for this became clear after VaporPro (moisture) examination of produced pellets. Moisture content in warm bath samples (tested on Samples 16 & 17:3,685 ppm and 2,983 ppm, respectively) were much higher than in cold water Samples 10 & 12 (1,443 ppm and 1,376 ppm, respectively). Air quench Sample 21 contained only 345 ppm of For the next study, a different twin extruder was examined. Twin screw extruder (ZSK-30) with 30:1 L/D used in this study was manufactured by Werner and Pfleiderer and equipped with QT20 KTron feeder having five temperature zones (instead of 10 as described in Examples 1A and 2). One or two vacuum ports have been used to devolatize polymer (remove unreacted monomer). The effect of different twin screw extruder, different throughput rates and screw speeds on polymer molecular weight and monomer removal was explored and results summarized in Table 3 below.

TABLE 3

Effect of Different ZSK-30 Extruder, Throughput Rates, RPMs on Polymer Molecular
Weight and Monomer Removal Using Two room temperatures (20° C.) Water Bathes

| Sample ID | Conditions | RPM | Monomer (mole %) | Mw (g/mol) | IV (dL/g) | Comments |
|---|---|---|---|---|---|---|
| Sample 22 | Original low Mw polymer resin, ground but not sieved | NA | 9.10 | 66,800 | 1.53 | Control Ground Sample |
| Sample 23 | Vacuum on port 1, V1 = 4.5 Torr, V2 = 5.2 Torr; Reversed T profile from 130° C. to 110° C.; 5 lbs./h | 100 | 0.74 | 65,800 | 1.64 | Excellent monomer removal, good pellets |
| Sample 24 | V1 = 3.9 Torr, V2 = 4.8 Torr; Reversed T profile from 130° C.; 7.5 lbs./h | 100 | 1.08 | 66,300 | 1.68 | At constant RPM, with higher throughput speed, lower monomer |
| Sample 25 | V1 = 3.8 Torr, V2 = 5.1 Torr; Reversed T profile from 130° C.; 10 lbs./h | 100 | 1.76 | 67,000 | 1.67 | removal, but stable Mw/IV |
| Sample 26 | V1 = 4.1 Torr, V2 = 5.6 Torr; Reversed T profile from 130° C.; 10 lbs./h | 300 | 1.30 | 64,100 | 1.65 | At constant throughput, with higher RPM better monomer removal |
| Sample 27 | V1 = 3.9 Torr, V2 = 4.8 Torr; Reversed T from 130° C.; with 2 die ends instead of one 10 lbs./h | 100 | 1.78 | 66,700 | 1.68 | Higher RPM better monomer removal, but Mw/IV may decrease |
| Sample 28 | V1 = 3.8 Torr, V2 = 4.3 Torr; Reversed T profile from 130° C.; with 2 die ends instead of one 10 lbs./h | 300 | 1.11 | 65,800 | 1.65 | |

Changing a twin extruder type and configuration improved on vacuum level. The vacuum level in this study was much improved, varied only between 3.8 and 5.6 Torr. Due to this improvement, the residual monomer in pellets dropped to below 2%, which is a preferred level for ground material that has been processed using a customary drying procedure. Polymer degradation was absent for all samples in this study, as indicated by stable weight average molecular weight and IV values. At a constant throughput speed, higher screw speeds leads to better monomer removal. Finally, with an increase in throughput speed (from 5 lbs./h to 10 lbs./h), the removal of unreacted monomer is notably less efficient.

Example 2. Inventive ZSK-30 Twin Screw Extruder Conditions for Strand Pelletization of Ground PDS Resins and its Fines with High Throughput Studies In the next study summarized in Table 4, three die ends were used for high throughput rates, one vacuum port (to address polymer flooding), and only one bath. One loop was used for all runs, except the one in the last row. Despite using one vacuum port only, the vacuum level in this study was excellent, kept constant at about 1.0 Torr.

TABLE 4

Effect of Different Throughput Rates on Polymer Molecular
Weight and Monomer Removal for Dyed PDS resin

| Sample ID | Conditions | RPM | Monomer (mole %) | Mw (g/mol) | IV (dL/g) | Comments |
|---|---|---|---|---|---|---|
| Sample 29 | Original regular Mw polymer resin, ground but not sieved | NA | 10.2 | 67,200 | 1.65 | Control Ground Sample |
| Sample 30 | Reversed T from 125° C. to 110° C.; $V_1$ = 947 mTorr; 5 kg/h | 100 | NA | NA | NA | Water residence time = 50 seconds |
| Sample 31 | Reversed T from 125° C. to 110° C.; $V_1$ = 954 mTorr; 7.5 kg/h | 150 | NA | NA | NA | Good pellets, but loose mid-extrudate |
| Sample 32 | Reversed T from 125° C. to 110° C.; $V_1$ = 970 mTorr; 10 kg/h | 175 | NA | NA | NA | Good pellets, but loose mid-extrudate |
| Sample 33 | Reversed T from 125° C. to 110° C.; $V_1$ = 965 mTorr; 15 kg/h | 150 | 5.65 | 74,600 | 1.65 | With high throughput lower monomer removal, |

TABLE 4-continued

Effect of Different Throughput Rates on Polymer Molecular
Weight and Monomer Removal for Dyed PDS resin

| Sample ID | Conditions | RPM | Monomer (mole %) | Mw (g/mol) | IV (dL/g) | Comments |
|-----------|-----------|-----|------------------|------------|-----------|----------|
| Sample 34 | Reversed T from 125° C.; $V_1$ = 969 mTorr; 15 kg/h, no loops | 125 | 5.61 | 74,700 | 1.65 | no loops as good as one loop |

Under these conditions, the highest polymer throughput speed achieved was 15 kg/h. The residual monomer dropped from 10.2% to 5.6%. Polymer degradation was not observed. The only issue was a mid-end in three die hole configuration that sometime became too loose, which may affect cutting efficiency.

In order to improve on high throughput pelletization, a four-end die configuration was used next. Both, regular and high molecular weight dyed polymers were used. In addition, a specific energy was calculated for each condition, as shown in the last column of Table 5 below. Specific energy, SE calculations are based on the equations below.

$$SE = \text{Applied } Kw/\text{Feed (throughput) rate}$$

$$\text{Applied } Kw = Kw \text{ (motor rating)} \times \%$$

$$\text{Torque} \times (\text{Running } RPM/\text{Max } RPM) \times \text{Gear efficiency}$$

where motor rating is 10, gear efficiency 0.97, and maximum RPM of 600 for the twin screw extruder used in this specific study. Specific Energy is very useful parameter for transferring the process to other twin extruders of different size. Conditions and data from this study are listed in Table 5.

TABLE 5

Effect of Different Throughput Rates on Polymer Molecular Weight
and Monomer Removal for Dyed PDS resin using four-die ends

| Sample ID | Conditions | RPM | Monomer (mole %) | Mw (g/mol) | IV (dL/g) | Average Specific Energy (kw/kg/hr) |
|-----------|-----------|-----|------------------|------------|-----------|-----------------------------------|
| Sample 35 | Original regular Mw polymer resin, ground but not sieved | NA | 10.2 | 67,200 | 1.65 | NA |
| Sample 36 | Reversed T from 125° C. to 110° C.; $V_1$ = 955 mTorr; 5 kg/h | 100 | 3.15 | 75,800 | 1.70 | 0.266; Pelletization look better than with 3 ends |
| Sample 37 | Reversed T from 125° C. to 110° C.; $V_1$ = 998 mTorr; meltT = 119° C., Torque = 95% 15 kg/h | 165 | 5.44 | 74,300 | 1.65 | 0.213 |
| | Switch to High Molecular Weight & Dyed PDS Polymer - High molecular weight polymer produced with the same process as regular molecular weight PDS except with a lower initiator concentration. | | | | | |
| Sample 38 | High MW PDS Polymer resin, ground but not sieved | NA | 9.22 | 93,500 | 2.07 | NA |
| Sample 39 | Reversed T from 130° C. to 110° C.; $V_1$ = 938 mTorr; meltT = 117° C., Torque = 78% 5 kg/h | 100 | 3.94 | 86,400 | 2.06 | 0.220 |
| Sample 40 | Reversed T from 130° C. to 110° C.; $V_1$ = 1.02 Torr; meltT = 122° C., Torque = 97% 10 kg/h | 125 | 5.02 | 87,300 | 2.08 | 0.230 |
| Sample 41 | Reversed T from 130° C. to 110° C.; $V_1$ = 1.09 Torr; meltT = 126° C., Torque = 101% 15 kg/h | 200 | 5.22 | 89,100 | 2.02 | 0.255; great uniform pellets, long run |

Using four-die ends the melt extrudate flow improved greatly, as well as pellets' cutting efficiency compared to three-die ends case. Even with the polymer throughput rate of 15 kg/h, pellets with uniform size and shape were observed with the monomer level dropping roughly to about 50% of its original value. No significant polymer degradation was observed in either regular or high molecular weight dyed resins. High weight average molecular weight resin (Sample 41) was synthesized based on the method described in Example 1 using the initiator ratio of 1,100:1. Finally, Specific Energy (SE) values ranged from 0.213 to 0.266 kw/kg/hr for these specified conditions.

Due to a unique sensitivity of natural (undyed) PDS polymer to UV light exposure, and lower crystallizability compared to its dyed counterpart, the next study focused on the twin extruder conditions for natural PDS material. As mentioned, an ability for a polymer material to crystallize quickly is important for pelletization purposes. The results of this study are summarized in the Table 6 below.

TABLE 6

Effect of Different Throughput Rates on Polymer Molecular Weight
and Monomer Removal for Natural PDS resin using four-die ends.

| Sample ID | Conditions | RPM | Monomer (mole %) | Mw (g/mol) | IV (dL/g) | Ave. SE (kw/kg/hr) | Comments |
|---|---|---|---|---|---|---|---|
| Sample 42 | Original natural polymer resin, ground but not sieved | NA | 7.57 | 88,700 | 1.95 | NA | Natural, Undyed Ground Polymer |
| Sample 43 | Reversed T from 130° C. to 110° C.; $V_1$ = 1.02 Torr; 5 kg/h | 100 | | Sample failed to pelletize | | | |
| Sample 44 | Reversed T from 130° C. to 105° C.; $V_1$ = 1.03 Torr; meltT = 127° C., Torque = 95% 12.5 kg/h | 225 | 3.91 | 77,400 | 1.87 | 0.334 | Great pellets, but high SE, some degradation |
| Sample 45 | Reversed T from 129° C. to 105° C.; $V_1$ = 1.06 Torr; meltT = 131° C., Torque = 100% 15 kg/h | 250 | 4.40 | 84,000 | 1.96 | 0.309 | Great pellets, lower SE, minimal degradation |
| Sample 46 | Reversed T from 130° C. to 100° C.; $V_1$ = 1.04 Torr; meltT = 119° C., Torque = 102% 10 kg/h | 125 | 4.51 | 80,100 | 1.94 | 0.299 | Even colder die zone T possible, but with higher |
| Sample 47 | Reversed T from 130° C. to 100° C.; $V_1$ = 1.05 Torr; meltT = 120° C., Torque-90% 10 kg/h | 200 | 3.93 | 79,700 | 1.90 | 0.351 | RPM, high SE and more degradation |

As indicated in Table 6, using the same extruder temperature profile as for dyed material, the natural PDS polymer failed to pelletize. However, lowering the end zone (close to die) temperatures further, from 110° C. to 105° C. and even further to 100° C., polymer was finally able to pelletize. Furthermore, the fibers immediately exiting die contained an opaque appearance, suggesting some level of nuclei/crystallinity retained in the four-end extrudes. This helped faster crystallinity development in the water bath, allowing for successful pelletization to take place.

For the polymer throughput speed of 15 kg/h and screw speed of 250 rpm (Sample 45), unreacted monomer dropped from 7.57% to 4.40%, while weight average molecular weight and IV stayed practically the same. SE for these conditions was 0.309 kw/kg/hr, generating great pellets.

In the next study, even higher throughput speeds were tried (up to 25 kg/h) using full vacuum, as well as the runs with no vacuum employed. The results are shown in Table 7.

TABLE 7

Effect of the Highest Throughput Rates Available and Effect of Vacuum Absence on Polymer Molecular Weight and Monomer Removal for Natural, Undyed PDS resin using four-die ends

| Sample ID | Conditions | RPM | Monomer (mole %) | Mw (g/mol) | IV (dL/g) | Ave. SE (kw/kg/hr) | Comments |
|---|---|---|---|---|---|---|---|
| Sample 48 | Original lower Mw polymer resin, ground but not sieved | NA | 6.97 | 74,800 | 1.81 | NA | Natural, Undyed, Ground Polymer |
| Sample 49 | Reversed T from 135° C. to 105° C.; $V_1$ = 1.03 Torr; meltT = 128° C., Torque = 98% 20 kg/h | 200 | 3.39 | 70,200 | 1.78 | 0.214 | good cutting, small flooding observed on V1 observed |
| Sample 50 | Reversed T from 135° C. to 105° C.; $V_1$ = 5.0 Torr; meltT = 128° C., Torque = 104% 25 kg/h | 225 | NA | NA | NA | 0.206 | Resin too soft, not enough crystallinity |
| Sample 51 | Reversed T from 130° C. to 105° C.; NO vacuum; meltT = 121° C., Torque = 104% 20 kg/h | 200 | 5.58 | 70,700 | 1.77 | 0.216 | Good cutting, excellent pellets w/o vacuum |
| Sample 52 | Reversed T from 130° C. to 105° C.; NO vacuum; meltT = 134° C., Torque = 107% 25 kg/h | 300 | 5.99 | 70,500 | 1.76 | 0.264 | Soft extrudate, difficulties in cutting extrudate |

Data in Table 7 indicate that the polymer throughput speed of 20 kg/h was successfully achieved. Higher speed (25 kg/h) resulted in too much shear, making the extrudate too soft for cutting. The calculated extruder residence time at the polymer throughput speed of 20 kg/h is about 26 seconds.

In addition, twin extruder runs without the vacuum port (Samples 51 and 52, atmospheric pressure) were executed successfully. Only a small portion of unreacted monomer is removed in this case, but the pellets look uniform, and polymer did not show any measurable degradation.

Finally, we conducted the study where we challenged specific energy limits, low and high, to observe any negative effect on pelletization performance and polymer properties. We accomplished that by varying the screw speeds. Both undyed and dyed PDS polymers were used. The results are presented in Table 8.

TABLE 8

Effect of the Varying Screw Speeds on Specific Energy and Polymer
Properties for Natural and Dyed PDS resin using four-die ends

| Sample ID | Conditions | RPM | Monomer (mole %) | Mw (g/mol) | IV (dL/g) | Ave. SE (kw/kg/hr) | Comments |
|---|---|---|---|---|---|---|---|
| Sample 53 | Original Natural lower Mw polymer resin, ground but not sieved | NA | 7.98 | 63,600 | 1.49 | NA | Natural, Undyed, Ground Polymer |
| Sample 54 | Reversed T from 125° C. to 105° C.; $V_1$ = 3.8 Torr; meltT = 110° C., Torque = 110% 15 kg/h | 100 | 6.18 | 63,800 | 1.50 | 0.148 | Large polymer flooding due to low RPM |
| Sample 55 | Reversed T from 125° C. to 105° C.; $V_1$ = 3.4 Torr; meltT = 115° C., Torque = 100% 15 kg/h | 150 | 4.65 | 62,300 | 1.52 | 0.202 | Less flooding, good cutting |
| Sample 56 | Reversed T from 125° C. to 105° C.; $V_1$ = 2.4 Torr; meltT = 116° C., Torque = 93% 15 kg/h | 200 | 4.91 | 64,000 | 1.53 | 0.250 | No flooding, good cutting |
| Sample 57 | Reversed T from 125° C. to 105° C.; $V_1$ = 2.3 Torr; meltT = 118° C., Torque = 86% 15 kg/h | 250 | 4.20 | 62,000 | 1.52 | 0.289 | No flooding, good cutting |
| Sample 58 | Reversed T from 125° C. to 105° C.; $V_1$ = 2.0 Torr; meltT = 120° C., Torque = 82% 15 kg/h | 300 | 3.98 | 61,000 | 1.50 | 0.331 | Small flooding, good cutting |
| Sample 59 | Reversed T from 125° C. to 105° C.; $V_1$ = 1.6 Torr; meltT = 121° C., Torque = 79% 15 kg/h | 350 | 3.94 | 60,200 | 1.48 | 0.372 | Larger flooding, some polymer degradation, but still good cutting |
| Sample 60 | Original Dyed higher Mw polymer resin, ground but not sieved | NA | 9.22 | 93,500 | 2.07 | NA | Original dyed polymer |
| Sample 61 | Reversed T from 135° C. to 105° C.; $V_1$ = 4.9 Torr; meltT = 116° C., Torque = 111% 15 kg/h | 150 | 6.90 | 85,400 | 2.00 | 0.224 | No polymer flooding, Torque too high |
| Sample 62 | Reversed T from 135° C. to 105° C.; $V_1$ = 5.5 Torr; meltT = 118° C., Torque = 105% 15 kg/h | 200 | NA | 83,900 | 1.98 | 0.282 | No flooding, cutting well |
| Sample 63 | Reversed T from 135° C. to 105° C.; $V_1$ = 4.7 Torr; meltT = 120° C., Torque = 101% 15 kg/h | 250 | 5.55 | 82,700 | 1.95 | 0.340 | No flooding, cutting well |
| Sample 64 | Reversed T from 135° C. to 105° C.; $V_1$ = 4.1 Torr; meltT = 123° C., Torque = 92% 15 kg/h | 300 | NA | 81,200 | 1.95 | 0.371 | No flooding, cutting well |
| Sample 65 | Reversed T from 135° C. to 105° C.; $V_1$ = 3.3 Torr; meltT = 126° C., Torque = 87% 15 kg/h | 350 | 4.35 | 80,500 | 1.90 | 0.410 | High SE, larger drop in IV/Mw |
| Sample 66 | Reversed T from 130° C. to 105° C.; $V_1$ = 3.4 Torr; meltT = 133° C., Torque = 106% 20 kg/h | 300 | 5.63 | 82,300 | 1.94 | 0.321 | High throughput, but low degradation |

For the first case of dyed PDS polymer with lower molecular weight polymer (sample 54), the lowest possible average specific energy for the throughput rate of 15 kg/h was 0.148 kw/kg/hr. This result was achieved with a screw speed of 100 rpm. However, significant polymer flooding was observed at this screw speed for a given throughput rate. On the other hand, the highest achievable average specific energy for this polymer was 0.372 kw/kg/hr that was achieved with a screw speed of 350 rpm. This high-end limit contributed to large polymer flooding and notable polymer degradation. Based on observed twin extrusion outcomes, including quality of pellets and polymer degradation, the optimal specific energy range for the PDS polymer of weight average molecular weight of about 65,000 g/mol is between 0.210 and 0.330 kw/kg/hr.

For the second case of dyed PDS with higher molecular weight polymer (sample 61), the lowest possible average specific energy for the throughput rate of 15 kg/h was 0.224 kw/kg/hr. This was accomplished with the screw speed of 150 rpm. Although the Torque was extremely high (111%), the good pellets were obtained with no polymer flooding observed. On the other hand, the highest achievable average specific energy for this polymer was 0.410 kw/kg/hr made with the screw speed of 350 rpm (Sample 65). However, this high-end limit contributed to notable polymer degradation. Based on the data in Table 8, the optimal specific energy range for the PDS polymer of weight average molecular weight of about 95,000 g/mol is between 0.220 and 0.370 kw/kg/hr.

Considering results from both, lower and higher molecular weight PDS polymers, the overall range of useful average specific energy is between 0.210 and 0.370 kw/kg/hr. More narrow range that works well for PDS polymers in the range of molecular weights from 65,000 to 95,000 g/mol is between 0.220 and 0.330 kw/kg/hr. Finally, the pellets (Sample 66 shown in Table 8) were made from higher molecular weight polymer (Sample 60) using the high throughput rate of 20 kg/h and screw speed of 300 rpm. For this sample calculated average specific energy was 0.321 kw/kg/hr. This sample will be used together with some previous samples in next section for fiber processing and subsequent analytical characterizations.

Example 3. Monofilament Extrusion of Selected Dyed and Undyed PDS Ground Resins and Pellets This example describes a typical monofilament extrusion of PDS resin. The goal is to show that fibers made from the inventive PDS pellets exhibit substantially the same physical and biological properties compared to fibers made from industry standard granular PDS resins without having to remove fines by sieving after grinding and/or drying the PDS polymer material.

Monofilament extrusion runs of several selected dyed and natural PDS pellets useful in the practice of the present invention were conducted using a one-inch JJ Jenkins Extruder with a 24:1 barrel length (1-22-1 design) equipped with a single grooved feed throat. The die size for each run was 70/1 with 5:1 L/D.

Prior to the monofilament extrusion, PDS ground resins and pellets produced in previous examples were stored under vacuum. A water bath tank capable of heating up to about 50° C., three sets of orientation godets (with heating capability) with one additional relaxation godet at the end of line prior to a collection spool were utilized. Immediately after water tank, an air cabinet is placed where extrudes are exposed to heat for developing crystallinity before drawing starts. Between the second and third godet, and also between the third godet and the final relaxation godet, were two annealing ovens used to heat the fibers to enhance its polymer morphology. Godets were not heated. The fiber diameter was measured inline using a Mitutoyo Lasermac (laser micrometer) located just before a collection spool.

In this example, for each PDS extrusion run, the bath temperature was set at 20° C., the speed ratios of the godets is listed in Table 9 below. The monofilaments sutures had a suture USP size of 2-0, corresponding to the fiber diameter about 14 mils. Extruder temperature profiles ranged from 100 to 120° C., with die temperature kept at 115° C. for lower molecular weight polymers, and 120° C. for higher molecular weight polymers.

TABLE 9

| | | Godet Speed | | | | Temp of Hot Air | Temp of Hot Air | Max Draw/ |
|---|---|---|---|---|---|---|---|---|
| Sample ID | Polymer Origin | G1 (fpm) | G2 (fpm) | G3 (fpm) | G4 (fpm) | Oven 1 (° C.) | Oven 2 (° C.) | Total Draw Ratios |
| Sample 38 | Dyed granular, higher Mw | 10 | 50 | 54 | 42 | 120 | 120 | 5.40/4.20 |
| Sample 41 | Dyed pellets from 38 | 10 | 52 | 54 | 44 | 120 | 120 | 5.40/4.40 |
| Sample 66 | Dyed pellets from 38 | 10 | 52 | 54 | 44 | 120 | 120 | 5.40/4.40 |
| Sample 42 | Natural granular, standard Mw | 10 | 52 | 54 | 43 | 120 | 120 | 5.40/4.30 |
| Sample 45 | Natural pellets from 42 | 10 | 52 | 54 | 44 | 120 | 120 | 5.40/4.40 |
| Sample 51 | Natural pellets from 48 | 10 | 52 | 54 | 44 | 120 | 120 | 5.40/4.40 |

Selected Extrusion Conditions for PDS 2-0 Monofilaments

Example 4. Physical Properties of 2-0 PDS
Monofilaments Made in Example 3

Monofilaments from Example 3 were rack annealed at an oven temperature of 85° C. for six hours. Dyed PDS monofilaments were scoured afterwards. All samples were sent for analytical testing including, Instron tensile examination, GPC, IV, NMR, DSC, and WAXD. A summary of major results is given below in Tables 10-12.

TABLE 10

Analytical and Instron Tensile Properties
for Annealed PDS 2-0 Monofilaments

| Fiber ID | Polymer Description | $M_w$/ IV | NMR-PDO (mole %) | Straight Tensile (lbs.) | Elon- gation (%) | Knot Tensile (lbs.) |
|---|---|---|---|---|---|---|
| F-38 | dyed ground resin (Sample 38) | 87.6k/ 2.15 | 0.00 | 11.99 | 50.2 | 7.47 |
| F-41 | dyed pellets made by 200 rpm screw speed (41) | 85.6k/ 2.08 | 0.00 | 11.96 | 49.1 | 7.55 |
| F-66 | dyed pellets with 300 rpm (66) | 85.3k/ 2.06 | 0.00 | 11.72 | 46.3 | 7.40 |
| F-42 | natural ground resin (42) | 81.7k/ 1.89 | 0.00 | 11.98 | 44.9 | 7.39 |
| F-45 | natural pellets with 250 rpm (45) | 75.6k/ 1.81 | 0.00 | 11.66 | 48.1 | 7.25 |
| F-51 | natural pellets with 200 rpm, no vacuum (51) | 70.5k/ 1.70 | 0.00 | 11.31 | 44.5 | 7.09 |

For dyed annealed 2-0 monofilaments, there is no significant difference in molecular weight, inherent viscosity, and tensile properties between fibers made from standard, ground resin and fibers made from PDS pellets. In case of natural polymers, as indicated in Table 10, there is a slight degradation of the fiber F-45 made by pellets compared to F-42 made from the same ground polymer. In any of the annealed monofilament no residual PDO monomer was detected.

TABLE 11

Calorimetric Properties for Annealed PDS 2-0 Monofilaments

| Fiber ID | First heat DSC data | | | Second heat DSC data | | | | |
|---|---|---|---|---|---|---|---|---|
| | $T_g$ (° C.) | $T_m$ (° C.) | $\Delta H_m$ (J/g) | $T_g$ (° C.) | $T_c$ (° C.) | $\Delta H_c$ (J/g) | $T_m$ (° C.) | $\Delta H_m$ (J/g) |
| F-38 | 1.63 | 101.5 | 91.6 | −9.74 | 34.9 | 45.1 | 104.6 | 53.1 |
| F-41 | 0.60 | 101.4 | 91.0 | −9.79 | 35.1 | 44.4 | 104.8 | 52.0 |
| F-66 | 0.58 | 102.0 | 92.3 | −9.74 | 34.0 | 44.5 | 104.7 | 52.8 |
| F-42 | 0.53 | 102.6 | 94.0 | −9.87 | 35.5 | 44.3 | 105.5 | 53.8 |
| F-45 | −1.64 | 103.1 | 97.6 | −10.0 | 34.1 | 45.5 | 105.5 | 55.5 |
| F-51 | −2.43 | 104.1 | 102.1 | −10.1 | 36.6 | 46.1 | 105.9 | 57.0 |

Calorimetric data from Table 11 indicate very similar first and second heat results for dyed group. For natural polymers, monofilaments F-45 and F-51 show lower glass transition temperature, and slightly higher melting point temperatures and heat of fusion particularly on the first heating scan compared to F-42. This can be explained by the lower molecular weight of these samples compared to ground resin fiber (F-42).

TABLE 12

Wide Angle X-Ray Diffraction for Annealed
Dyed PDS 2-0 Monofilaments

| Fiber ID | Crystal % | Size at 22.0° angle | Size at 23.6° angle | Crystal Orientation |
|---|---|---|---|---|
| F-38 | 49.6 | 91.4 | 74.5 | 0.866 |
| F-41 | 48.7 | 89.3 | 72.8 | 0.872 |
| F-66 | 49.8 | 88.3 | 73.4 | 0.877 |

Data from Table 12 indicate no significant difference in crystallinity level, crystal size, and crystal orientation between dyed annealed monofilaments. WAXD data for natural group are not available.

Example 5. In Vitro Breaking Strength Retention
(BSR) of Dyed and Natural Annealed 2-0
Monofilaments Produced in Example 3

The ultimate test to confirm that annealed monofilaments made from inventive PDS pellets have comparable physical and biological properties to original ground resin counterparts is to conduct BSR study under the same conditions. For this purpose, all dyed annealed monofilaments produced in Example 3 were subjected to in vitro BSR analysis under both, elevated (55° C./pH=8.98) and physiological (body) conditions (37° C./pH=7.27) as described in the experimental section. Natural group was tested under physiological (body) conditions only. Data are expressed in pounds and in percentages of the original strength remained.

As indicated in FIGS. 2-5, for dyed 2-0 monofilaments group there is practically no difference in BSR data under both, physiological and elevated conditions. A couple of data points for F-66 monofilament appeared lower than the rest (under physiological test 28 and 42 days, and elevated 10-day point), but these may be an experimental error. These BSR data confirm that this inventive PDS pelletization process does not cause any negative effect on physical and biological properties on resulting fibers.

Figure 6:
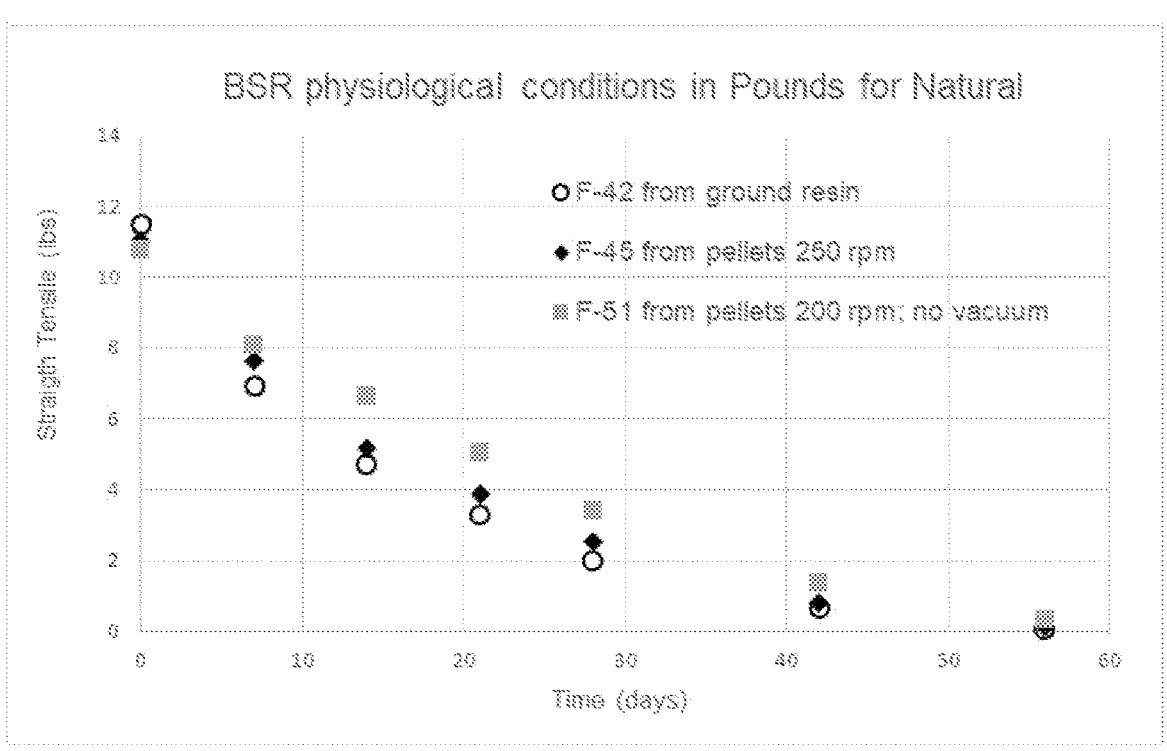
FIG. 6. In vitro BSR Data (in pounds) for 2-0 Natural Annealed Monofilaments Under Physiological Conditions (37° C./pH=7.27) Produced in Example 3.
Figure 7:
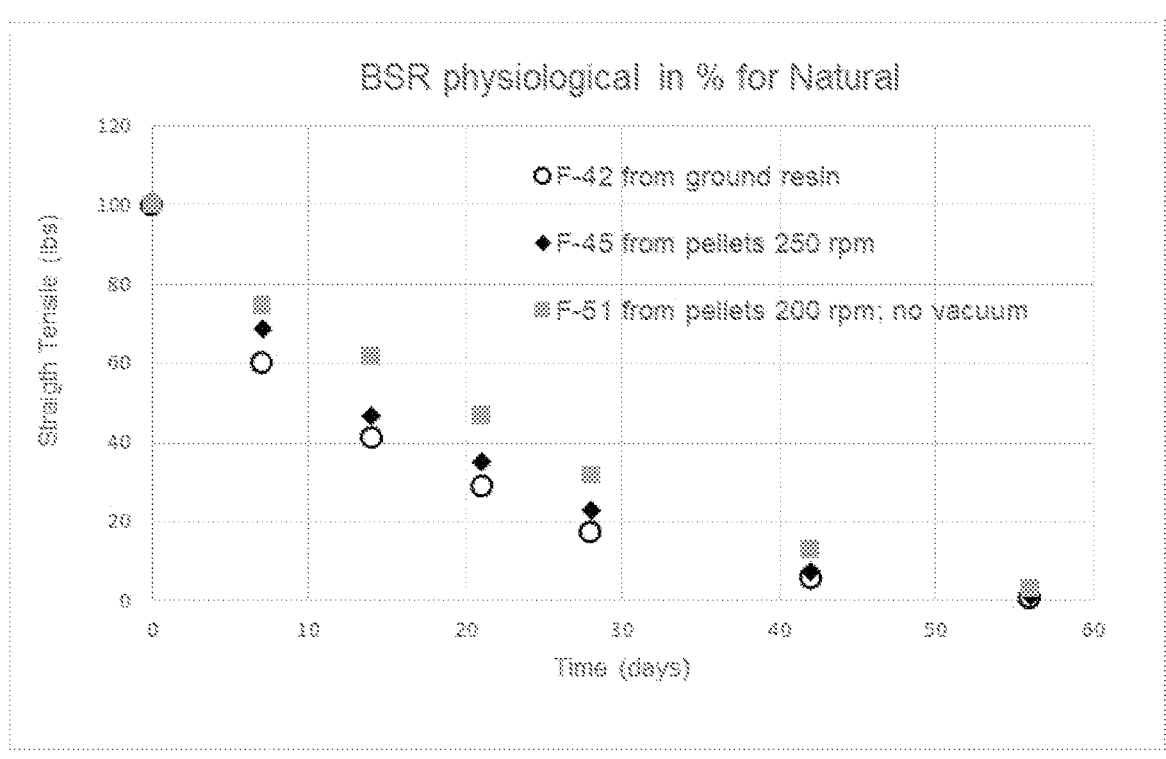
FIG. 7. In vitro BSR Data (in percentages) for 2-0 Natural Annealed Monofilaments Under Physiological Conditions Produced in Example 3.

For the natural PDS polymer group, however, the novel pelletization process may even bring some unexpected benefits to fiber property. In FIGS. 6 and 7, in vitro BSR data for natural group under physiological conditions are given in pounds and percentages, respectively.

Surprisingly, each BSR data points in these figures clearly show that annealed natural fibers produced in Example 3 from the inventive pelletization step exhibit longer/higher BSR properties than the fiber made from the original ground resin. All fibers produced in Example 3 were treated equally and exposed to ambient conditions with the same amount of time.

We claim:

1. A process for making uniform poly-para-dioxanone (PDS) pellets from a PDS material having non-sieved fines comprising:

a) Polymerizing dioxanone monomers in a vessel under an elevated temperature to generate polymer chains of PDS materials in molten form;

b) Discharging the molten PDS materials from the reaction vessel into one or more containers within a second reaction vessel for sufficient time and under appropriate temperature and pressure conditions to cause said PDS material to increase molecular weight via solid state polymerization;

c) Grinding said solid PDS material into a PDS material comprising large granules of PDS and PDS fines;

d) Feeding said PDS material comprising large granules of PDS and PDS fines into an inlet of an extruder having a cylindrical barrel with one or more screw, at least one outlet and a plurality of temperature zones arranged sequentially along the length of the cylindrical barrel from the inlet to the at least one outlet;

e) Heating the PDS material within the extruder to form a flowable PDS mass, f) Conveying said PDS mass along the length of said cylindrical barrel by action of the screw to produce a PDS extrudate in the form of a rod or filament, Wherein in the sequential measurable temperature zones along the length of the cylindrical barrel, the PDS mass is subjected to sufficient energy to produce an inverted temperature profile as having a highest measurable temperature in the vicinity of the inlet and a lowest measurable temperature at the die, with each of the remaining sequential measurable temperatures zones having steadily decreasing measurable temperatures from the highest measurable temperature zone to the lowest measurable temperature zone, g) Quenching the PDS extrudate after extrusion from the outlet by either air cooling or in a water bath;

h) Cutting the quenched PDS extrudate material to produce uniform PDS pellets.

2. The process of claim 1 wherein the PDS mass in step (e) is subject to devolatization by providing the cylindrical barrel with at least one vacuum port for removal of monomer to forming an PDS extrudate having reduced unreacted monomer content relative to the unreacted monomer content introduced into the cylindrical barrel.

3. The process of claim 1 wherein the highest measurable temperature is 140° C. and the lowest measurable temperature is 100° C.

4. The process according to claim 1 wherein the at least one screw rotates within the barrel at a speed of least 100 revolutions per minute.

5. The process according to claim 4 wherein the at least one screw rotates within the barrel at a speed of between 100 revolutions per minute and 300 revolutions per minute.

6. The process according to claim 1 wherein the PDS extrudate is quenched after extrusion from the outlet in a water bath having a water bath temperature between 10° C. and 25° C.

7. The process according to claim 2 wherein removal of monomer from original ground resin having between 8% and 10% residual monomer was reduced to between 1% and 5% monomer in produced pellets.

8. The process according to claim 1 wherein the extruder delivers an average specific energy between 0.210 kw/kg/hr and 0.370 kw/kg/hr.

9. The process according to claim 8 wherein for PDS mass having an average molecular weight in the range from 65,000 g/mol to 95,000 g/mol, the extruder delivers an average specific energy between 0.220 kw/kg/hr and 0.330 kw/kg/hr.

10. The process according to claim 1 wherein the PDS pellets have a uniform size of 20 milligrams per pellet (plus or minus 3 milligrams) and a cylindrical shape.

11. The process according to claim 1 wherein the PDS pellets have chemical uniformity as demonstrated by a collection of measurements of the intrinsic viscosity from a sample size having a variability of plus or minus 2%.

12. The process according to claim 1 further comprising the step of drying said pellets to remove moisture and optionally further drying to remove monomer.

13. The process according to any one of the preceding claims further comprising the step of extruding a fiber from the PDS pellets.

14. The process according to claim 1 further comprising the step of incorporating a nuclei favorable dye with dioxanone monomers in the vessel of step (a).

* * * * *